(12) United States Patent
Canfield et al.

(10) Patent No.: US 7,127,685 B2
(45) Date of Patent: Oct. 24, 2006

(54) INSTANT MESSAGING INTERFACE HAVING A TEAR-OFF ELEMENT

(75) Inventors: James Andrew Canfield, Arlington, VA (US); Kenneth Carbone, Annandale, VA (US); David Fairlie Colburn, Reston, VA (US); Linda Nols Myers, Purcellville, VA (US); Thomas E. Van Lenten, Ashburn, VA (US); Gregory Alan Willis, Arlington, VA (US)

(73) Assignee: America Online, Inc., Dulles, VA (US)

( * ) Notice: Subject to any disclaimer, the term of this patent is extended or adjusted under 35 U.S.C. 154(b) by 253 days.

(21) Appl. No.: 10/284,429

(22) Filed: Oct. 31, 2002

(65) Prior Publication Data

US 2004/0056893 A1 Mar. 25, 2004

Related U.S. Application Data

(60) Provisional application No. 60/376,181, filed on Apr. 30, 2002.

(51) Int. Cl.
*G06F 3/00* (2006.01)

(52) U.S. Cl. ...................................... 715/842; 715/851
(58) Field of Classification Search ................ 345/758, 345/759, 752; 709/204, 206, 203, 219; 715/842, 715/851, 853, 753, 758, 759, 752, 765, 763, 715/840, 738, 841, 804, 805
See application file for complete search history.

(56) References Cited

U.S. PATENT DOCUMENTS

| | | |
|---|---|---|
| 5,283,560 A | 2/1994 | Bartlett |
| 5,287,514 A | 2/1994 | Gram |
| 5,416,895 A | 5/1995 | Anderson et al. |
| 5,544,352 A | 8/1996 | Egger |
| 5,546,528 A | 8/1996 | Johnston |
| 5,581,670 A | 12/1996 | Bier et al. |
| 5,588,107 A | 12/1996 | Bowden et al. |
| 5,617,114 A | 4/1997 | Bier et al. |
| 5,617,526 A | 4/1997 | Oran et al. |
| 5,627,960 A | 5/1997 | Clifford et al. |
| 5,644,737 A | 7/1997 | Tuniman et al. |
| 5,664,133 A | 9/1997 | Malamud et al. |
| 5,692,142 A | 11/1997 | Craycroft et al. |
| 5,712,995 A | 1/1998 | Cohn |
| 5,721,852 A | 2/1998 | Porter |
| 5,742,813 A | 4/1998 | Kavanagh et al. |

(Continued)

OTHER PUBLICATIONS

Anonymous "GameSpy Arcade—Play Hundreds of Online Multiplayer Games", Internet Document, [Online], pp. 1-3, retrieved from the internet, http://www.gamespyarcade.com/support/help/communicate.shtml [retrieved on Apr. 12, 2004].

(Continued)

*Primary Examiner*—Cao (Kevin) Nguyen
(74) *Attorney, Agent, or Firm*—Fish & Richardson P.C.

(57) ABSTRACT

A user interface on a display enables user perception of information regarding a communications session that leverages an instant messaging platform. The user interface includes an instant messaging application user interface and one or more tear-off elements corresponding to ongoing instant messaging communications sessions. Each tear-off element is configured to enable perception and selection by a user of a corresponding instant messaging communications session. Also, each tear-off element is configured to be independently visually separated from other elements of the instant messaging application user interface and maintained as a separate entity on the instant messaging application user interface.

44 Claims, 17 Drawing Sheets

U.S. PATENT DOCUMENTS

| | | |
|---|---|---|
| 5,754,176 A | 5/1998 | Crawford |
| 5,760,768 A | 6/1998 | Gram |
| 5,798,752 A | 8/1998 | Buxton et al. |
| 5,801,703 A | 9/1998 | Bowden et al. |
| 5,832,494 A | 11/1998 | Egger et al. |
| 5,838,315 A | 11/1998 | Craycroft et al. |
| 5,877,758 A | 3/1999 | Seybold |
| 5,877,765 A | 3/1999 | Dickman et al. |
| 5,884,306 A | 3/1999 | Bliss et al. |
| 5,929,851 A | 7/1999 | Donnelly |
| 5,937,417 A | 8/1999 | Nielsen |
| 5,974,413 A | 10/1999 | Beauregard et al. |
| 5,990,905 A | 11/1999 | Chew et al. |
| 5,995,101 A | 11/1999 | Clark et al. |
| 6,002,398 A | 12/1999 | Wilson |
| 6,002,400 A | 12/1999 | Loring |
| 6,018,571 A | 1/2000 | Langlois et al. |
| 6,057,844 A | 5/2000 | Strauss |
| 6,078,935 A | 6/2000 | Nielsen |
| 6,091,409 A | 7/2000 | Dickman et al. |
| 6,092,068 A | 7/2000 | Dinkelacker |
| 6,097,389 A | 8/2000 | Morris et al. |
| 6,118,427 A | 9/2000 | Buxton et al. |
| 6,144,375 A | 11/2000 | Jain et al. |
| 6,147,685 A | 11/2000 | Bliss et al. |
| 6,173,316 B1 | 1/2001 | De Boor et al. |
| 6,188,403 B1 | 2/2001 | Sacerdoti et al. |
| 6,229,539 B1 | 5/2001 | Morcos et al. |
| 6,233,571 B1 | 5/2001 | Egger et al. |
| 6,233,726 B1 | 5/2001 | Bowman et al. |
| 6,237,135 B1 | 5/2001 | Timbol |
| 6,246,411 B1 | 6/2001 | Strauss |
| 6,248,946 B1 | 6/2001 | Dwek |
| 6,252,594 B1 | 6/2001 | Xia et al. |
| 6,260,148 B1 | 7/2001 | Aggarwal et al. |
| 6,275,790 B1 | 8/2001 | Yamamoto et al. |
| 6,281,879 B1 | 8/2001 | Graham |
| 6,301,609 B1 | 10/2001 | Aravamudan et al. |
| 6,304,879 B1 | 10/2001 | Sobeski et al. |
| 6,317,128 B1 | 11/2001 | Harrison et al. |
| 6,346,952 B1 | 2/2002 | Shtivelman |
| 6,362,842 B1 | 3/2002 | Tahara et al. |
| 6,369,837 B1 | 4/2002 | Schirmer |
| 6,377,944 B1 | 4/2002 | Busey et al. |
| 6,381,735 B1 | 4/2002 | Hunt |
| 6,384,849 B1 | 5/2002 | Morcos et al. |
| 6,407,757 B1 | 6/2002 | Ho |
| 6,434,599 B1 | 8/2002 | Porter |
| 6,519,629 B1 * | 2/2003 | Harvey et al. ............... 709/204 |
| 6,539,421 B1 * | 3/2003 | Appelman et al. .......... 345/758 |
| 6,691,159 B1 * | 2/2004 | Grewal et al. ............... 709/219 |
| 6,781,608 B1 * | 8/2004 | Crawford .................... 715/758 |
| 6,784,901 B1 | 8/2004 | Harvey et al. |
| 6,907,447 B1 | 6/2005 | Cooperman et al. |
| 6,981,223 B1 | 12/2005 | Becker |
| 2002/0073207 A1 | 6/2002 | Widger et al. |
| 2002/0097277 A1 | 7/2002 | Pitroda |
| 2002/0101446 A1 | 8/2002 | Tang |
| 2002/0130904 A1 | 9/2002 | Becker et al. |
| 2003/0052915 A1 | 3/2003 | Brown et al. |
| 2003/0142141 A1 | 7/2003 | Brown et al. |
| 2003/0164862 A1 | 9/2003 | Cadiz et al. |
| 2003/0210265 A1 | 11/2003 | Haimberg |

OTHER PUBLICATIONS

"Design Requirements Document (DRD)," Instant AOL, Instant AOL Refresh v1.1, Document Version 8.0, Oct. 23, 2001, 8 pages.
"Design Requirements Document (DRD)," Gamera, Revision 18, Apr. 10, 2001, 110 pages.
"AOL IM Companion", Tricon Software & Development, published Mar. 7, 2001. 7 total pages retrieved Jul. 16, 2003 from World Wide Web: http://download.com/com/3000-2150-5056089.html?legacy=cnet (1 page); http://www.triconsoft.com/screenshots/mnuIMAnswer.jpg (1 page); http://www.triconsoft.com/screenshots/mnuOptions.jpg (1 page); http://www.triconsoft.com/screenshots/IMCompanionTabs.jpg (1 page); http://www.triconsoft.com/screenshots/IMCompanionListBox.jpg (1 page); http://www.triconsoft.com/IMCompanion.asp (2 pages).
"Move or Cover Sheets", Microsoft Excel 2000 Help File. 8 total pages retrieved Jul. 21, 2003 from World Wide Web: http://www.triconsoft.com/IMCompanionShots.asp (4 pages); mk:@MSIT-Store:C:\Program%20Files\Microsoft%20Office\Office\1033\xlmain9.chm::/htm . . . (1 page); About Microsoft Excel (3 pages).
"A.I.M Frames", BPS Software, lastest version Jul. 3, 2003, first published version Jun. 1, 1998. 7 total pages retrieved Jul. 11, 2003 from World Wide Web: http://www.bpssoft.com/AIMFrame/index.htm (3 pages); http://www.bpssoft.com/AIMFrame/history.htm (4 pages).
"Power Tools Pro", BPS Software, first published release May 10, 2000. 24 total pages retrieved Jul. 16, 2003 from World Wide Web: http://www.bpssoft.com/PowerTools/history.htm (19 pages); http://www.bpssoft.com/PowerTools/images/shots/9pwrim.gif (1 page);http://www.bpssoft.com/PowerTools/ptshots.htm (4 pages).
International Search Report (6 pages).
Amanda Matthiesen, "Hotmail Help: A Brief Introduction to the Free E-mail Service", May 2000, Internet: http://www.town.brookline.ma.us/library/computer/computer/hotmail.htm, pp. 1-13.
Tricon Software, "Tricom Software & Development", Apr. 20, 2001, Internet: http://www.triconsoft.com, 10 pages.
Office Action, Application Serial No. 10/259,844, dated Dec. 15, 2005, 19 pages.

* cited by examiner

INSTANT MESSAGING INTERFACE HAVING A TEAR-OFF ELEMENT

This application claims priority from U.S. Provisional Application No. 60/376,181, filed Apr. 30, 2002, which is incorporated by reference.

TECHNICAL FIELD

The following description relates generally to providing an instant messaging interface having a tear-off element.

BACKGROUND

Online service providers facilitate access to information and services by providing interactive UIs (User Interfaces) that help users navigate to desired resources. Generally, a UI allows a user to execute particular commands or to link to certain locations by simply selecting screen objects such as icons, windows, and drop-down menus. The design of a UI has a significant impact on a user's online experience. In particular, the icons, the windows, and the menus of a UI may be arranged to enable a user to locate preferred information and services quickly and easily.

SUMMARY

In one general aspect, a user interface on a display enables user perception of information regarding a communications session that leverages an instant messaging platform. The user interface includes an instant messaging application user interface and one or more tear-off elements corresponding to ongoing instant messaging communications sessions. Each tear-off element is configured to enable perception and selection by a user of a corresponding instant messaging communications session. Also, each tear-off element is configured to be independently visually separated from other elements of the instant messaging application user interface and maintained as a separate entity on the instant messaging application user interface.

Implementations may include one or more of the following features. For example, the instant messaging application user interface may include a general interface tear-off element that is configured to enable perception and selection of several of the tear-off elements collectively and to enable collective visual separation of the several tear-off elements from other elements of the instant messaging application user interface. The general interface tear-off element may be, for example, a tab or a button. The interface may be configured to enable reattachment to other elements of the general interface. For instance, a tear-off element may be configured to be reattached to an interface other than the interface from which the tear-off element was separated.

In one implementation, one or more tear-off elements may be dedicated to and enable perception and selection of a single corresponding instant messaging communications session. The dedicated tear-off elements may be independently visually separable from other elements of the instant messaging application user interface. The dedicated tear-off elements may include, for example, tabs or buttons. The user interface may also include a manual status control associated with a dedicated tear-off element. For instance, the manual status control may enable an indication of whether a message in the corresponding instant messaging communications session has been perceived by the user.

In one implementation, one or more of the tear-off elements may be rendered visually as an integral part of the instant messaging application user interface. In another implementation, the display of the tear-off element persists when the element is visually separated from other elements of the instant messaging application user interface. In yet another implementation, the tear-off element may be configured to enable reattachment to other elements of the instant messaging application user interface.

The tear-off elements may be configured to be separately manipulable. In one implementation, one or more of the tear-off elements may be configured to be separately removable from the instant messaging application user interface, separately invokable, separately minimizable and/or separately movable.

In one implementation, more than one of the tear-off elements may be configured to be collectively visually separated from other elements of the instant messaging application user interface and maintained as a separate display element. In another implementation, a tear-off element may configured to be individually visually separated from other elements of the instant messaging application user interface and maintained as a separate display element. In yet another implementation, the instant messaging application user interface and tear-off elements may be configured to display limited information about one or more concurrent instant messaging sessions. For instance, the user interface may enable a more detailed display of one or more of the instant messaging sessions through selection of a corresponding tear-off element.

Aspects of the instant messaging interface having a tear-off element may be implemented by an apparatus and/or by a computer program stored on a computer readable medium. The computer readable medium may comprise a disc, a client device, a host device, and/or a propagated signal. In addition, aspects of the instant messaging interface having a tear-off element may be implemented in a client/host context or in a standalone or offline client device. The instant messaging interface having a tear-off element may be rendered in a client/host context and may be accessed or updated through a remote device in a client/host environment. The instant messaging interface having a tear-off element also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

DESCRIPTION OF DRAWINGS

Like reference symbols in the various drawings indicate like elements.

DETAILED DESCRIPTION

Figure 1:
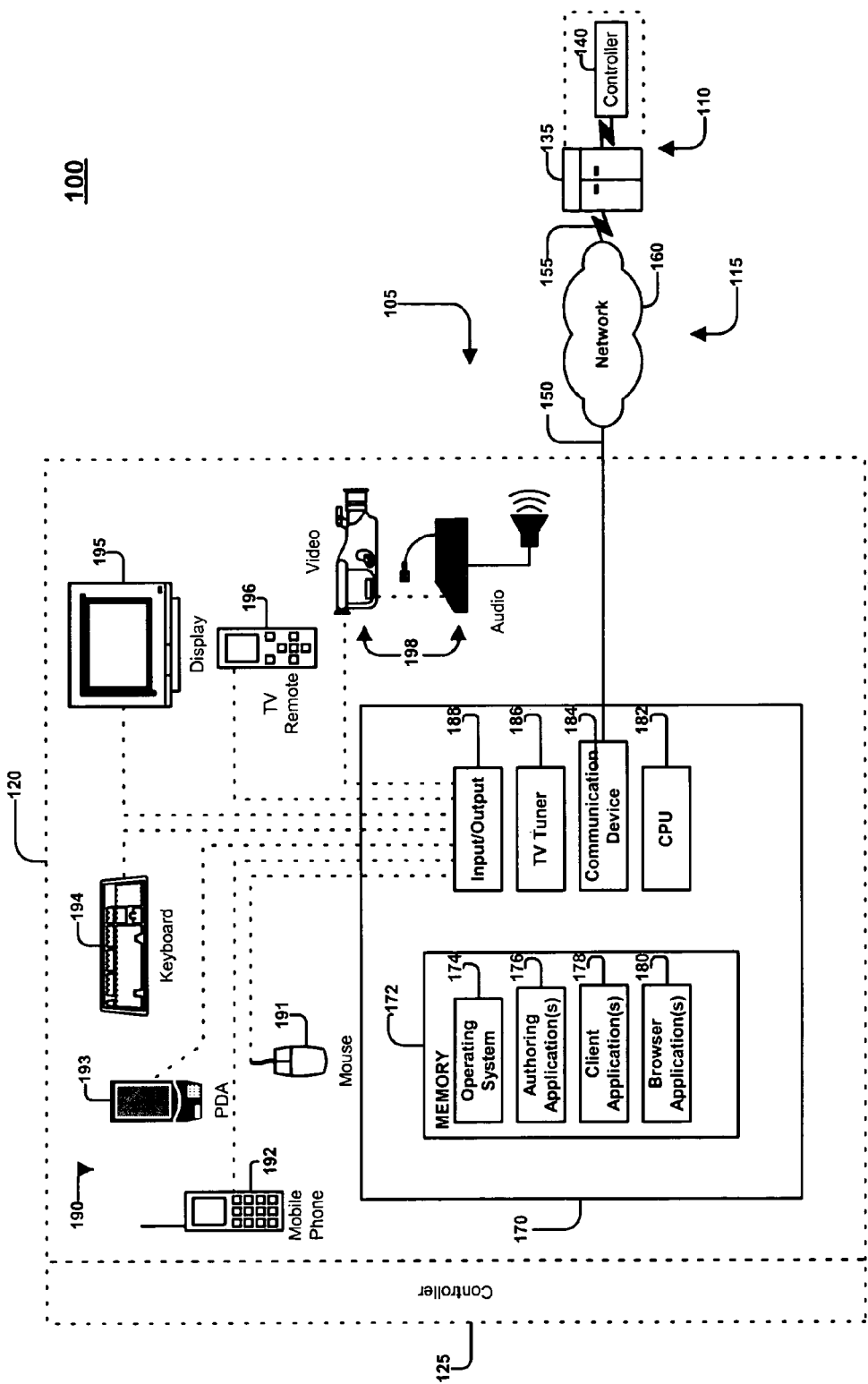
FIGS. 1–3 are block diagrams of a communications system.

In general, one or more tear-off elements may be provided in an interface for instant messaging (IM) applications or other online applications. For example, tear-off elements may be provided to collectively form a tabbed IM user interface (UI), where each tear-off element represents a corresponding ongoing IM session. A user may tear-off one or more of the tear-off elements individually or collectively. Tear-off elements that have been torn off may be independently or collectively reattached to the user interface from which they were torn, or they may be reattached to a different user interface. In addition, once torn, the tear-off elements may be separately or collectively manipulated, moved, minimized, invoked, and activated.

In the example of a tabbed IM UI, the tear-off elements may be presented as tabs positioned adjacent to one another to enable selection of and switching between IM sessions, and other operations. When several tear-off element tabs are concurrently shown, an active tab corresponds to the IM session currently being viewed or manipulated by the user, and inactive tabs correspond to the IM sessions which are not currently being viewed or manipulated by the user. A tear-off element tab typically includes an identifier, such as the screen name of an IM buddy, to identify the particular IM session to which the tab is assigned. When displayed, the identifier for an IM session typically is configured such that a user is able to read or otherwise recognize the identifier without additional information. A tear-off element tab also may include a status indicator to indicate whether a new IM message is waiting to be viewed in the IM session corresponding to that tear-off element tab.

A tear-off element may be rendered by any type of hardware, software, device, computer, computer system, equipment, component, program, application, code, storage medium, or propagated signal. In one implementation, the tear-off element is rendered in a client/host context, and the tear-off element may be accessed or updated through a remote device in a client/host environment. In another implementation, the tear-off element is implemented in a standalone or offline client context, where the tear-off element is rendered by the standalone/offline device and accessed or updated through a remote device in a non-client/host environment such as, for example, a LAN server serving an end user or a mainframe serving a terminal device.

Typically, IM communications involve an instantaneous or nearly instantaneous communication between two users, where each user is able to perceive online presence information regarding other selected users ("buddies"). The IM communications may be machine-to-machine communications that occur without intervention by, or communication through, an instant messaging server after a communication session is established or authentication is performed. Examples of IM communications include those provided by AIM (America Online Instant Messenger), AOL (America Online) Instant Messaging, Yahoo Messenger, MSN Messenger, and ICQ, among others. Although discussed below primarily with respect to IM applications, the tear-off element may be provided for other online applications such as chat, e-mail, and players for streaming media.

Figure 2:
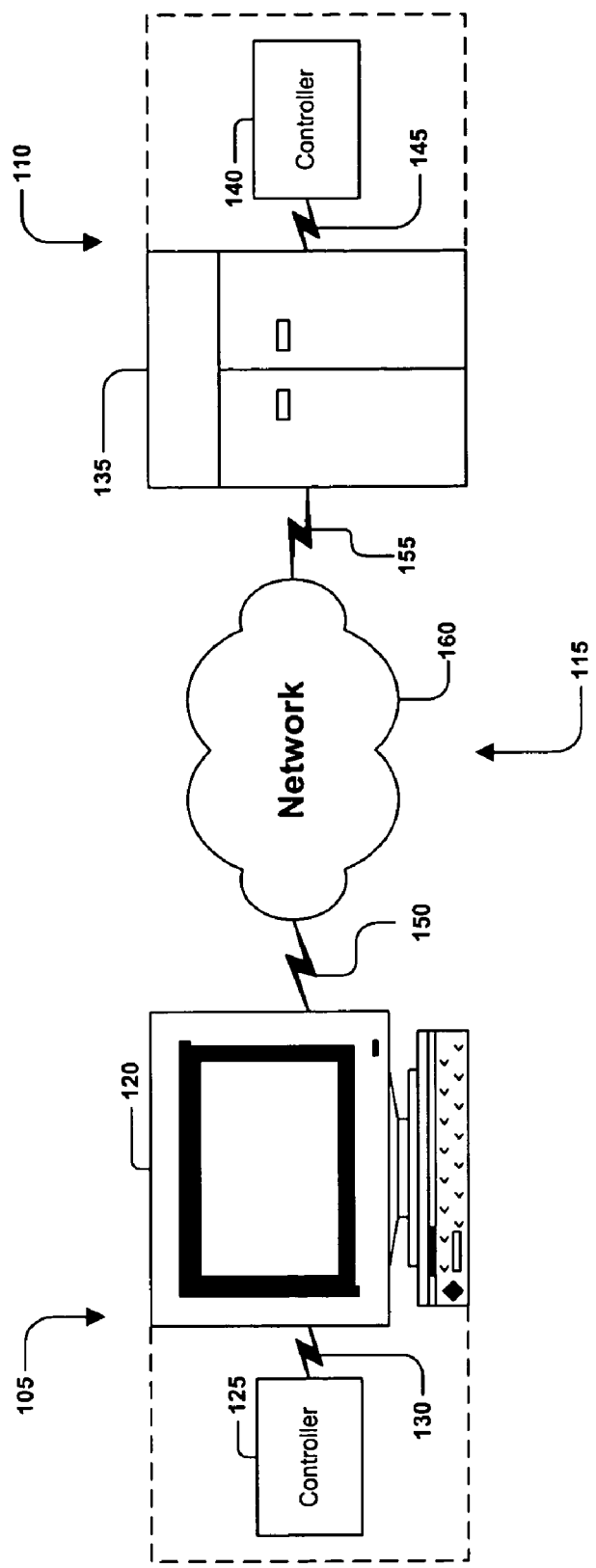

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

FIG. 1 illustrates a communications system 100 including a client system 105 communicating with a host system 110 through a communications link 115.

The client device 120 typically includes a general-purpose computer 170 having an internal or external memory 172 for storing data and programs such as an operating system 174 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 176 (e.g., word processing programs, database programs, spreadsheet programs, or graphics programs) capable of generating documents or other electronic content; client applications 178 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 180 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 172 of the general-purpose computer 170. Alternatively, in another implementation, the client controller 125 may access application programs externally stored in and/or performed by one or more device(s) external to the general-purpose computer 170.

The general-purpose computer 170 also includes a central processing unit 182 (CPU) for executing instructions in response to commands from the client controller 125, and a communication device 184 for sending and receiving data. One example of the communication device 184 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 170 optionally includes a television ("TV") tuner 186 for receiving television programming in the form of broadcast, satellite, and/or cable TV signals. The TV tuner 186 permits the client device 120 to selectively and/or simultaneously display network content received by communications device 184 and TV programming content received by the TV tuner 186.

The general-purpose computer 170 may include an input/output interface 188 that enables wired or wireless connection to various peripheral devices 190. Examples of peripheral devices 190 include, but are not limited to, a mouse 191, a mobile phone 192, a personal digital assistant 193 (PDA), an MP3 player (not shown), a keyboard 194, a display monitor 195 with or without a touch screen input, a TV remote control 196 for receiving information from and rendering information to users, and an audiovisual input device 198.

Although FIG. 1 illustrates devices such as a mobile telephone 192, a PDA 193, and a TV remote control 196 as being peripheral with respect to the general-purpose computer 170, in another implementation, such devices may themselves include the functionality of the general-purpose computer 170 and operate as the client device 120. For example, the mobile phone 192 or the PDA 193 may include computing and networking capabilities and function as a client device 120 by accessing the delivery network 160 and communicating with the host system 110. Furthermore, the client system 105 may include one, some or all of the components and devices described above.

Referring to FIG. 2, a communications system 200 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 3:
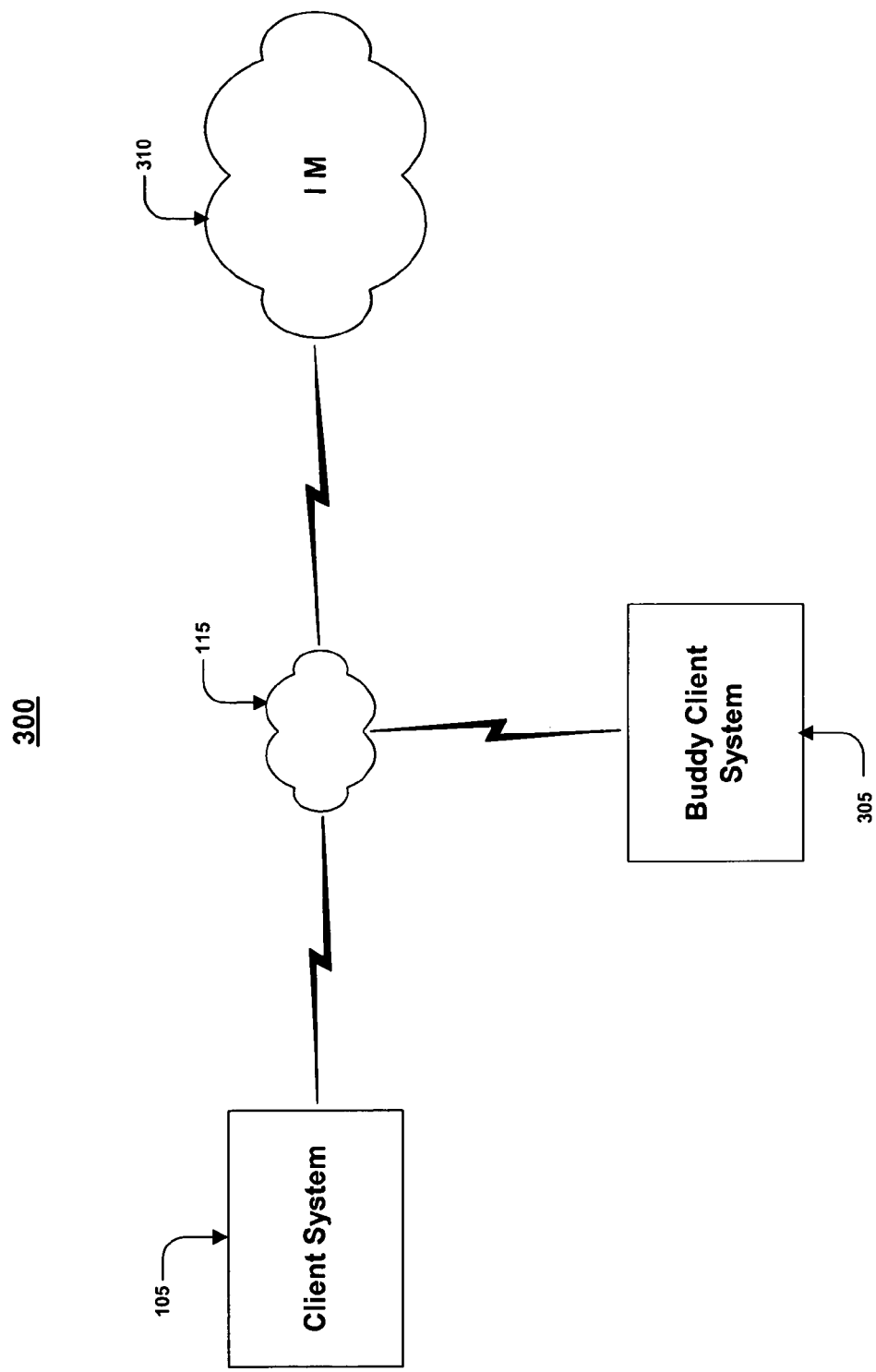

FIG. 3 illustrates a communications system 300 including a client system 105 communicating with a buddy client system 305 and an IM host system 310 through a communication link 115. Such a communications system may be used by users of IM service providers, such as, for example, AIM, ICQ, Yahoo Messenger, and Microsoft Messenger.

In one implementation, the IM host system 310 may have characteristics similar to those described above with respect to host system 110, and the client system 105 and the buddy client system 305 may include communication software to enable users of the client systems to the IM host system 310.

The IM host system 310 may support IM services irrespective of a user's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the client system 105 establishes a connection to the IM host system 310. Once a connection to the IM host system 310 has been established, the client system 105 may directly or indirectly transmit data to and access content from the IM host system 310. By accessing the IM host system, a user can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. Buddy client system 305 may be similarly manipulated to establish a contemporaneous connection with IM host system 310.

Once connectivity is established, a user who is using client system 105 may view whether a buddy using buddy client system 305 is online, and typically may view whether the buddy is able to receive IMs. If the buddy is online, the user may exchange IMs with that buddy.

In one implementation, the IMs sent between client system 105 and buddy client system 305 are routed through IM host system 310. In another implementation, the IMs sent between client system 105 and buddy client system 305 are routed through a third party server (not shown), and also may or may not be routed through IM host system 310. In yet another implementation, the IMs are sent directly between client system 105 and buddy client system 305.

Figure 4:
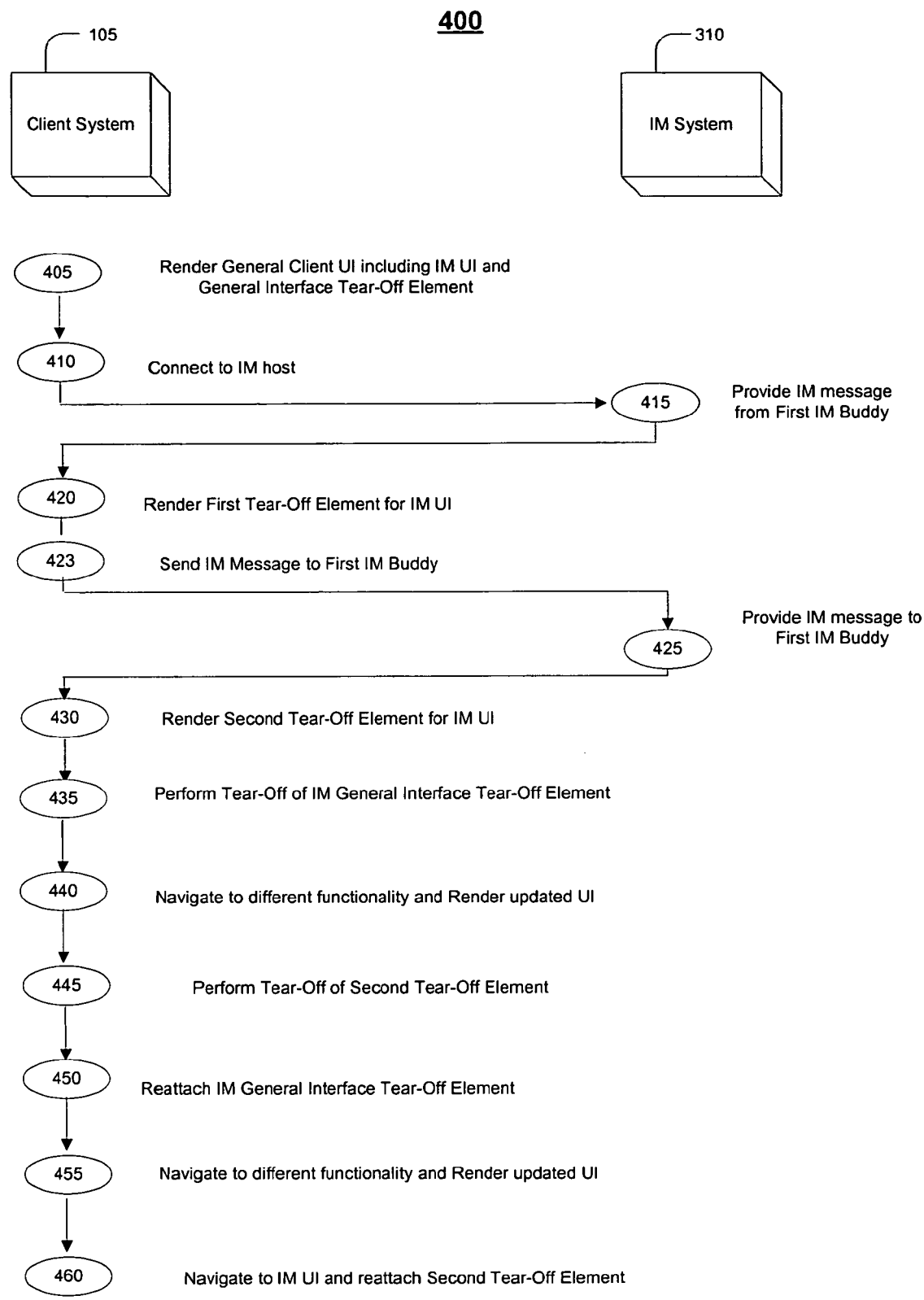
FIG. 4 is a flow chart of a process that may be implemented by the systems of FIGS. 1–3.

Referring to FIG. 4, a client system 105 and an IM host system 310 interact according to a procedure 400 to provide a tear-off element for instant messaging (IM) applications or other online applications. The procedure 400 may be implemented by any type of hardware, software, device, computer, computer system, equipment, component, program, application, code, storage medium, or propagated signal. Furthermore, although not shown in FIG. 4, the client system 105 and the IM host system 310 may be directly or indirectly interconnected through known or described delivery networks, examples of which are described with respect to network 160. In one implementation, the procedure 400 may be implemented in a client/host context, and the tear-off element may be provided for instant messaging (IM) applications or other online applications through a remote device in a client/host environment. In another implementation, the procedure 400 may be implemented in a standalone or offline client context, and the tear-off element may be provided for instant messaging (IM) applications or other online applications by the standalone/offline device and may be accessed or updated through a remote device in a non-client/host environment such as, for example, a LAN server serving an end user or a mainframe serving a terminal device. The procedure 400 may be implemented to provide tear-off elements for instant messaging (IM) applications or other online applications of any OSP or ISP.

Procedure 400 generally involves rendering a tear-off element for instant messaging (IM) applications or other online applications. While some functions of procedure 400 may be performed entirely by the client system 105, other functions may be performed by the collective operation of the client system 105 and the IM host system 310. For example, a tear-off element may be rendered entirely by the client. However, the UI may be rendered based upon information provided to the client by the IM host system.

Figure 5:
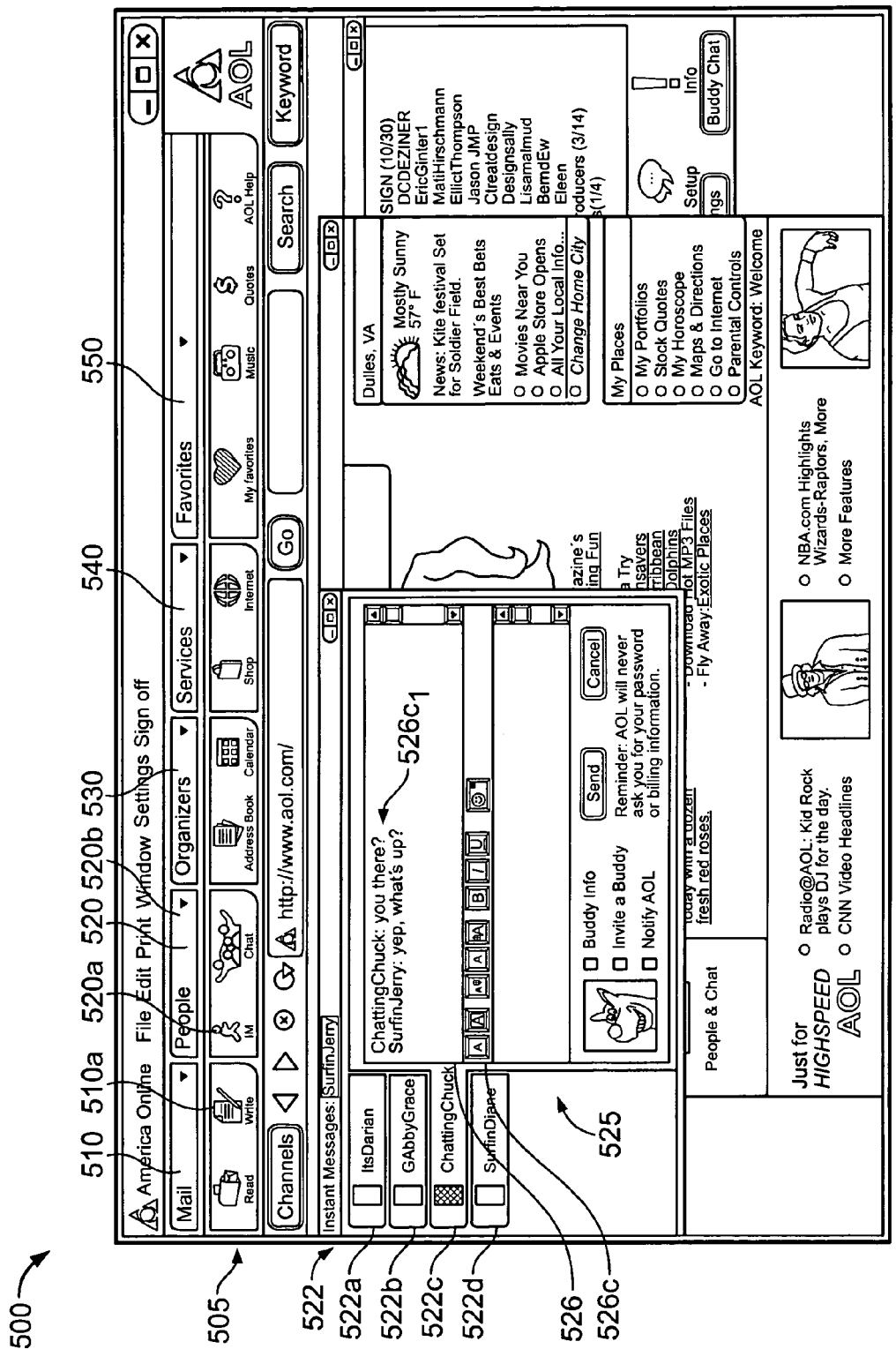
FIGS. 5–11 and 12A–12F are illustrations of different graphical user interfaces that may be implemented by the systems of FIGS. 1–3 when executing the process of FIG. 4.

In procedure 400, a general client UI, including an IM UI and a general interface tear-off element, is rendered (step 405). For example, FIG. 5 illustrates an example of a general client user interface (UI) 500 that may be presented to a user of an online service provider. The UI 500 includes a toolbar 505 for quickly enabling activation of features such as, for example, reading or writing e-mail, exchanging IM messages with another user, entering chat areas with other users, shopping or accessing the Internet. The toolbar 505 includes general interface tear-off elements 510, 520, 530, 540, and 550, each of which is configured to enable activation of an associated user interface. The general interface tear-off elements may include, for example, a button or a tab. The general interface tear-off element 520 is configured to enable activation of an associated Instant Messaging (IM) interface 525 through user manipulation of a button 520a or a tab 520b.

The IM interface 525 is a tabbed IM interface. IM interface 525 includes sub-interfaces 526 that each have an associated sub-interface actionable item (tear-off element) 522 and represent a distinct and concurrent ongoing communications session. The tear-off element may include, for example, a button or a tab. The tear-off element 522 enables the activation and deactivation of the corresponding sub-interface 526 and, consequently, enables or disables user perception of the ongoing communications session. In the example of FIG. 5, IM interface 525 has associated tear-off elements 522a, 522b, 522c, and 522d, that represent a distinct and concurrent ongoing communications session. The sub-interface 526 presents the contents of the IM session corresponding to a selected tear-off element 522. For example, sub-interface 526c corresponds to tear-off element 522c and allows the user (SurfinJerry) to view the communications session 526c1 with buddy "ChattingChuck." The sub-interfaces corresponding to the tear-off elements 522a, 522b, and 522d are not actively displayed. The tear-off elements 522a, 522b, 522c, and 522d are arranged in a group such that each tear-off element is close to another tear-off element. The adjacent placement of the tear-off elements assists with the user identification, selection, and activation of the actionable items.

The tear-off element 522 persists beyond active display of the associated sub-interface 526. The element 522 identifies the communications session, and allows the user to activate the sub-interface 526 if not currently displayed. For example, the tear-off element 522c persists beyond active display of the associated sub-interface 526c, identifies the communications session, and allows the user to activate the sub-interface 526c if not currently displayed. Also, each of the tear-off elements 522a, 522b, and 522d persists beyond active display of their associated sub-interfaces (not shown), identifies each communications session, and allows the user to activate the sub-interface that is not currently displayed. However, if the IM interface 525 is closed, minimized, or otherwise removed from active display, the associated tear-off elements 522a, 522b, 522c, 522d are likewise closed, minimized, or otherwise removed from active display unless the tear-off element 522 has been "torn off." A tear-off element that has been torn off persists beyond active display of the associated interface 525 and the associated sub-interface 526. The torn off sub-interface may be reattached by the user, and will no longer persist beyond active display of the associated interface once it has been reattached. Also, in one implementation, the general interface tab 520 may be a tear-off tab, and may enable IM interface 525 may to be torn off from the toolbar 505, and persist even after the user navigates to and displays a different interface. For example, the IM interface 525 and the corresponding general interface tear-off tab 520 may be torn off and persist in display while the user navigates to and displays a different interface, such as an interface for writing e-mail. In the example of FIG. 5, an interface for writing e-mail may be activated by user manipulation of general interface tear-off element 510 or 510a.

Referring again to FIG. 4, after the general client UI is rendered, the client system 105 and the IM host system 310 are physically and/or logically connected (step 410). For instance, client system 105 may connect to the IM host system 310 across a network (e.g., network 160) by supplying a user identification and password to a server (e.g., a login server) in order to obtain access to the IM host system 310.

Next, the IM host system 310 provides an IM message from a first IM buddy to the client system 105 (step 415). The IM host system 310 may provide the IM message across a network 160, and the IM message may include a text message portion, a time of delivery, and a screen name of the first IM buddy.

Referring also to FIG. 5, the client system 105 renders a first tear-off element 522 for the IM user interface and assigns the first tear-off element 522 to the IM session with the first buddy (step 420). If the IM session is to be actively displayed, a first sub-interface 526 associated with the tear-off element 522 is rendered. In one implementation, the client system 105 renders the first tear-off element 522 when the IM message from the first IM buddy is provided, and separately renders other portions of the IM user interface 525 at a different time. In another implementation, the entire IM user interface 525, including the first tear-off element 522 and first sub-interface 526, are rendered when the IM message is provided. The tabbed IM UI may be presented using a Web page having text, images, audio, video, and/or any other type of content.

The IM UI includes a first tear-off element corresponding to the IM session with the first buddy, and also may include other actionable items corresponding to other IM sessions with other buddies. For example, as shown in FIG. 5, the IM UI 525 has a first tear-off element 522c associated with the first sub-interface 526c corresponding to the IM session with the first buddy ("ChattingChuck").

Rendering the first tear-off element also may include initializing or updating the status indicator, the identifier, the conversation counter, the display area status indicator, the information indicator, and the display area. Also, if the maximum number of concurrent IM sessions or tear-off elements corresponding to IM sessions available for display is exceeded when the IM message is provided, then rendering the tabbed IM UI may include rendering a scroll arrow, examples of which are described with respect to FIG. 6.

Figure 6:
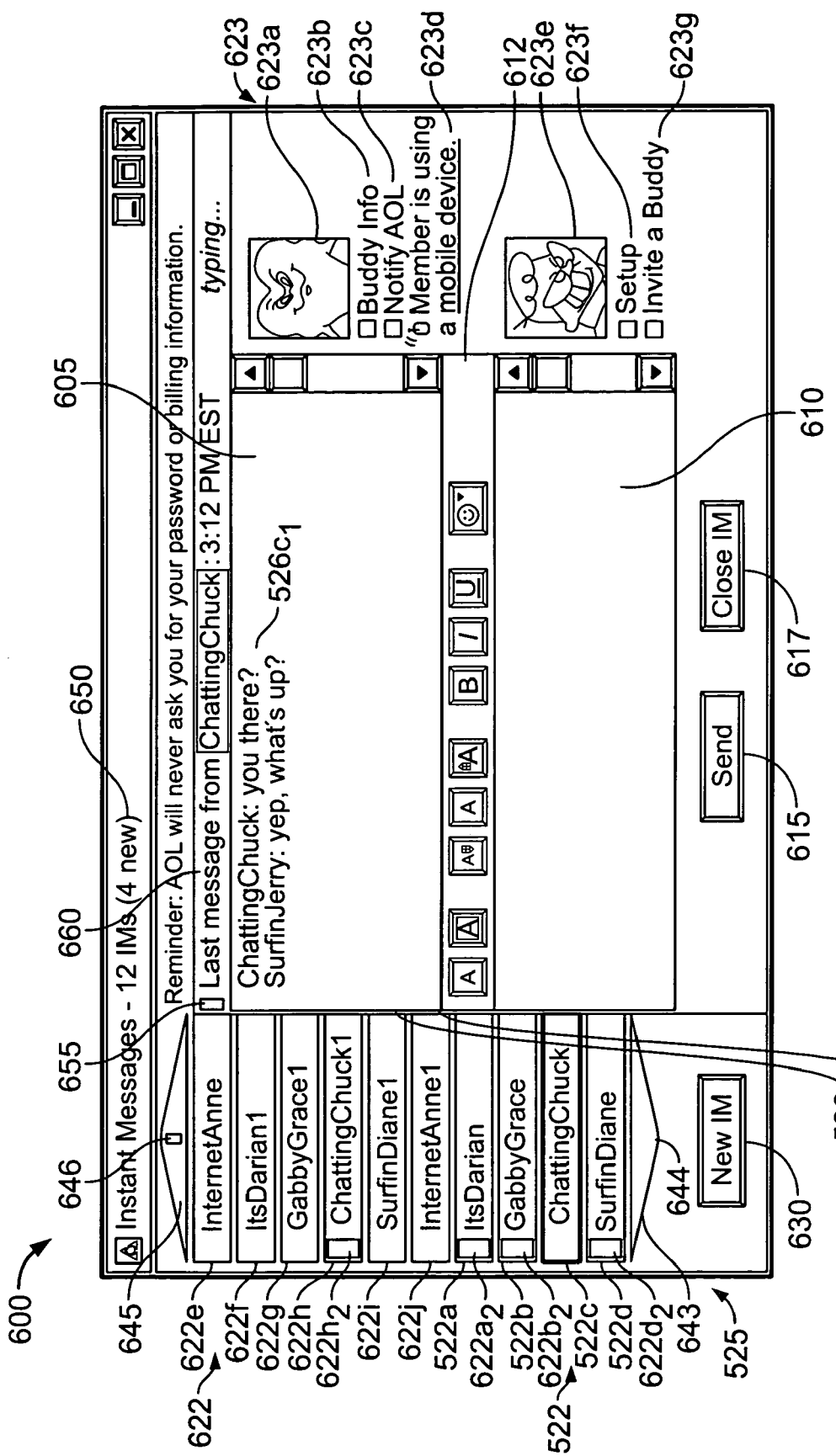

FIG. 6 illustrates one example of a user interface (UI) 600 that is presented to a user of an IM service provider such as the AOL Instant Messenger (AIM) service provided by America Online. The UI 600 may be rendered in response to user manipulation of a general interface tear-off element 520. The UI 600 may be rendered on the user's client system 105 using software stored on that client system 105.

The UI 600 includes an IM interface 525, and the IM interface 525 includes an IM display area 605 to display the IM conversation 526c1 of an IM session being actively displayed and represented by sub-interface 526c and tear-off element 522c. An IM compose area 610 is used to compose a message to send to the IM buddy ("ChattingChuck") in the active IM session, typically by clicking on the send control button 615 in the UI. Font and appearance controls 612 are provided to control how the message being entered in the IM compose area 610 is displayed to the IM buddy and in the IM display area 605 once the message in the IM compose area 610 is sent. A control button 617 is provided to close the active IM session. The IM conversation 526c1 may include the identity of an IM buddy along with a message from that buddy, and also may include other information such as the time that a message was sent or received.

The IM interface 525 of UI 600 contains tear-off elements 522 and 622. Each of tear-off elements 522 and 622 is associated with a sub-interface 526 and assigned to a pending IM session. The instant messaging session may use a combination of text, graphics, audio, and video data to communicate with an IM buddy. The IM buddy may be identified by a screen name and typically is another user or an automated system, such as an artificial intelligence system or other automated system or agent having a screen name that responds to IM queries from a user. An active tear-off element 522c corresponds to the IM session that the user views or with which the user interacts currently through, for example, sub-interface 526c. Inactive tear-off elements 522a, 522b, 522d, and 622e through 622j correspond to the other concurrent IM sessions that the user currently does not fully view or with which the user currently is not enabled to interact. The user ordinarily is not able to perceive the conversations or a portion of the conversations in the communications sessions corresponding to the inactive tear-off elements. Also, the user ordinarily is not able to perceive any of the IM conversations if the IM interface 525 is no longer actively displayed.

An area 623 is provided to display various icons and controls. For example, the area 623 may include a buddy icon 623a corresponding to the IM buddy from whom an IM message was received, and a buddy icon 623e corresponding to the user who has received and is viewing the IM message. Other controls are provided, including a control 623b to retrieve information about the IM buddy, a control 623c to notify the service provider of inappropriate behavior by the IM buddy, a control 623d to indicate to the user whether the IM buddy is using a mobile device, a control 623f to setup various features of the service, and a control 623g to invite a new buddy to join in the IM session, among others. Also, a control button 630 is provided to initiate a new IM session with a different IM buddy.

The IM interface 525 of UI 600 includes a conversation counter 650 that provides information relating to the concurrent IM sessions, such as the total number of concurrent IM sessions, the number of new IM sessions, and the number of ongoing IM sessions having a new IM message waiting to be viewed. In general, the conversation counter 650 provides a perceivable indication to the user of statistics regarding the concurrent instant messaging session. In the example of FIG. 6, ten (10) concurrent IM sessions is the maximum number of concurrent IM sessions that may be concurrently displayed. The conversation counter 650 indicates that there are twelve (12) concurrent IM sessions and four (4) new messages waiting for review. Scroll bars 643 and 645 are provided for scrolling to perceive tear-off elements corresponding to open IM sessions because the total number of concurrent IM sessions exceeds the maximum number of concurrent conversations that may be displayed simultaneously.

The scroll bars 643 and 645 allow the user to scroll up and down among the concurrent IM sessions, and provide an indication that one or more of the IM sessions "hidden" by the scroll bar has a new IM message waiting to be viewed. For example, as shown in FIG. 6, neither scroll bar 643 nor scroll bar 645 appear grayed out, indicating that an addition IM session may be viewed by selecting on either scroll bar 643 or scroll bar 645. Also, status indicators 644 and 646 are provided on the scroll bars 643 and 645 to indicate whether one or more of the IM sessions accessible by the scroll bar has a new IM message. In the example of FIG. 6, status indicator 644 indicates that there is no new IM message in any IM session covered by the scroll bar 643, while status indicator 646 indicates that there is a new IM message waiting to be viewed in an IM session covered by scroll bar 645.

The tear-off elements 522 and 622 include a status indicator (e.g., $622a2$, $622b2$, $622d2$, $622h2$) to indicate whether a new IM message within the IM session corresponding to an interface tear-off element remains pending for review. In general, the indicator provides a perceivable status indication to the user that a new message is pending in at least one concurrent instant messaging session. Once the new message is viewed or acknowledged, the indicator changes and the conversation counter 650 is updated to reflect one fewer message waiting to be viewed. The tear-off elements 522 and 622 also may include an identifier, such as the screen name of the IM buddy, to identify the particular IM session to which it is assigned. Although not shown in FIG. 6, either the conversation counter 650, the indicator, or both, may distinguish between a new message received from an ongoing IM session and new message received as part of the initiation of a new IM session.

The IM interface 525 of UI 600 also includes a manual status control 655 to enable the user to manually indicate whether the last message from the IM buddy corresponding to the IM session for the active tear-off element displayed in the IM display area 605 has been viewed or acknowledged, without having to send an actual reply message to extinguish the new message status. The IM interface 525 of UI 600 also includes a last message information indicator 660 that provides information about the time that the last message was received from an IM buddy.

Referring again to FIG. 4, using the client system 105, the user may choose to view the IM message from the first buddy and to send an IM message back to the first IM buddy (step 423). The client system 105 may send the message to the IM host system 310 by providing the IM message across a network 160. The IM message may include a text message portion, a time of delivery, and a screen name of the user. Referring to FIG. 6, in order to send the message, the user may choose to type the message in the IM compose area 610 and send the message by clicking on the send control 615.

The IM Host system 310 provides the IM message to the first IM buddy (step 425). The IM host system 310 may provide the IM message across a network 160 to the client system associated with the first buddy (not shown).

Next, the client system 105 renders a second tear-off element for the IM interface (step 430). The second tear-off element corresponds to a second IM session from a second buddy. If the second IM session is to be actively displayed, a second sub-interface 526 associated with the second tear-off element 522 is rendered. In one implementation, the client system 105 renders the second tear-off element 522 when the IM message from the second IM buddy is provided and separately renders other portions of the IM user interface 525 at a different time. In another implementation, the entire IM user interface 525, including the second tear-off element 522 and second sub-interface 526, is rendered when the second IM message is provided. For example, as shown below with respect to FIGS. 5 and 7, a second tear-off element 522d and a second sub-interface 526d may be rendered. The tabbed IM UI may be presented using a Web page having text, images, audio, video, and/or any other type of content.

Rendering second tear-off element also may include updating the status indicator, the conversation counter, the display area status indicator, the information indicator, and the display area. For example, referring to FIG. 6, the updated UI 600 may be rendered to update the sub-interface 526 and tear-off element 622 to show that no new message is present and waiting to be viewed in the IM session corresponding to the tear-off element. Conversation counter 650 may be updated to show that are no new IM messages waiting to be viewed. Information indicator 660 may be updated to show the time of the user's message. The user's IM message to the first buddy may also be rendered in the IM display area 605.

Figure 7:
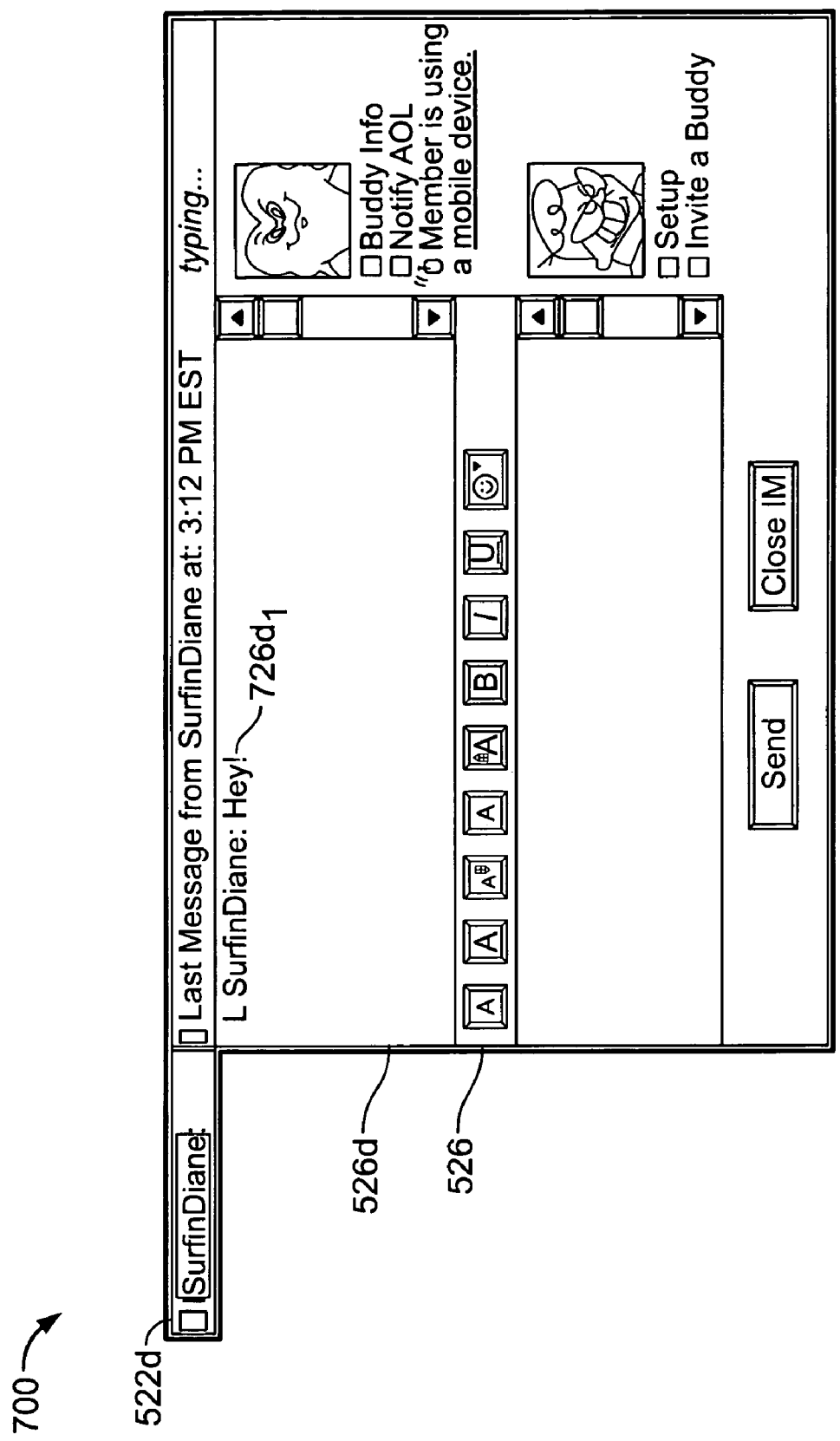

FIG. 7 illustrates one example of a UI 700 that may be presented to a user of an IM service provider such as the AOL Instant Messenger (AIM) service provided by America Online. The UI 700 includes an IM sub-interface 526d that represents a distinct and concurrent communications session, and allows a user to view the contents of the communications session 726d1. The sub-interface 526d is associated with a tear-off element 522d. IM sub-interface 526 of UI 700 may be rendered in response to user manipulation of a general interface tab, IM interface 525, or other UI to generate an instant message to send to an IM buddy, or in response to an instant message received from an IM buddy. In general, the UI 700 will be rendered on the user's client system 105 using software stored on that client system 105.

Referring again to FIG. 4, at some later time, the user performs a tear off of the general interface tear-off element and the IM interface (step 435). As discussed below with respect to FIG. 8, the user may perform the tear off by placing a mouse pointer over the general interface tear-off element 520 and dragging the tear-off element away from the toolbar 505.

Figure 8:
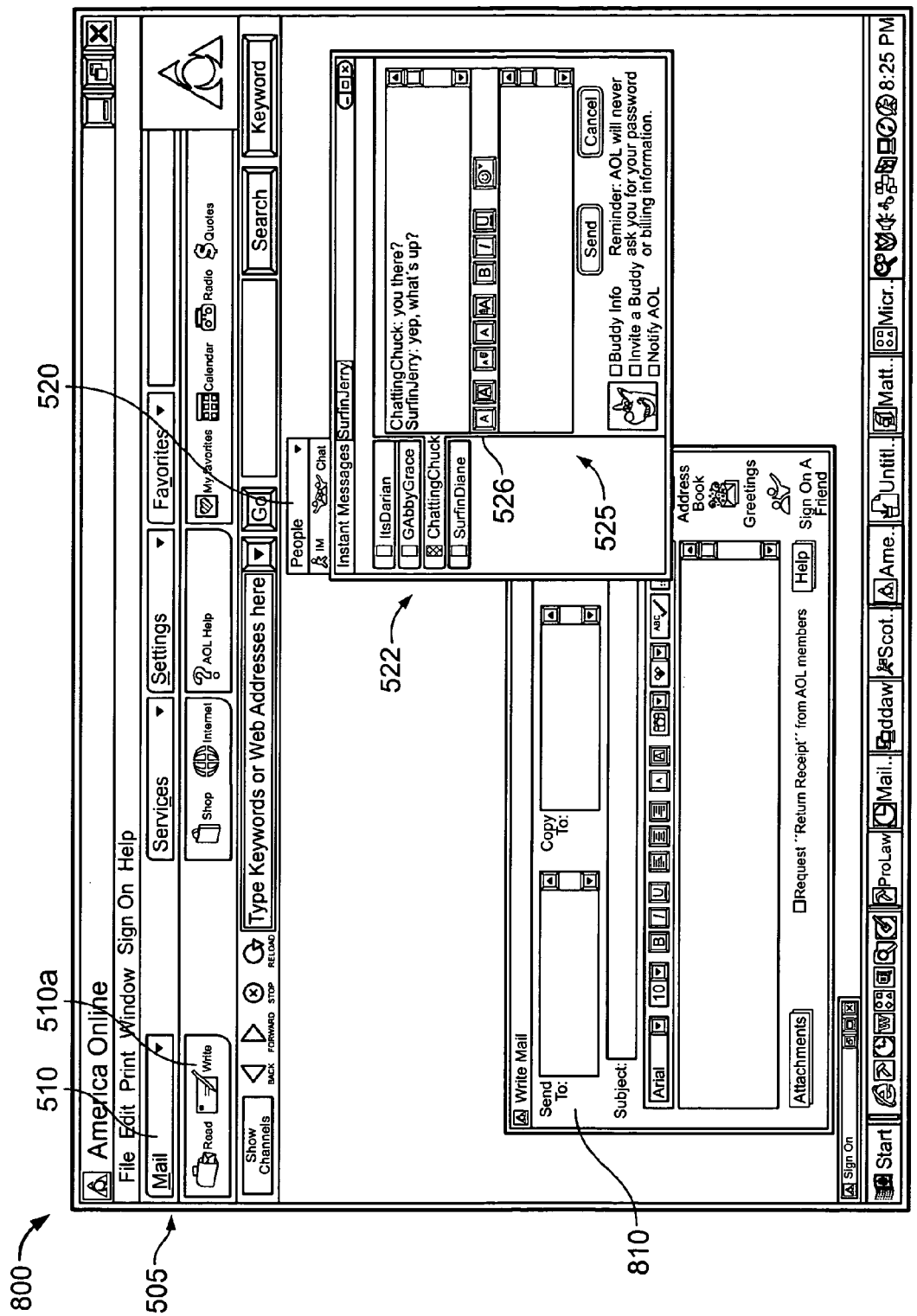

FIG. 8 is an example of a general client UI 800 and further illustrates the UI 500 that was discussed above with respect to FIG. 5. In the example of FIG. 8, the user has navigated to an interface for writing e-mail 810, which may be activated by user manipulation of general interface tear-off element 510 or 510a. The user has also performed a "tear off" of general interface tear-off element 520, including IM interface 525. In one implementation, the user performs the tear off by placing a mouse pointer over the general interface tear-off element 520 and dragging the element 520 away from the toolbar 505. The torn off general interface tear-off element 520 and associated IM interface 525 will remain displayed as the user navigates to different content areas, such as the interface for writing e-mail 810. The general interface tear-off element 520 and IM interface 525 also may be reattached to the general UI 800 or to a different UI after being torn off. In another implementation, only the general interface tear-off element 520 remains displayed as the user navigates to different content areas. The sub-interface 526 and/or the tear-off element 522 may be torn off from a UI 525 and may persist beyond active display of the associated UI 525. The sub-interface 526 and the tear-off element 522 also may be reattached to the UI 525 or a different UI after being torn off.

Referring again to FIG. 4, the user next navigates to different functionality, and an updated UI is rendered (step 440). For example, as shown in FIG. 8, a user may navigate to an interface for writing e-mail 810, which is activated by user manipulation of general interface tear-off element 510 or 510a. An updated UI 800 is rendered in response to this user navigation.

The user then performs a tear off of the second tear-off element and the sub-interface (step 445). As discussed below with respect to FIG. 9, the user may perform the tear off by placing a mouse pointer over the second tear-off element 522d and dragging the tear-off element 522d away from the general interface tear-off element 520 and associated IM interface 525.

Figure 9:
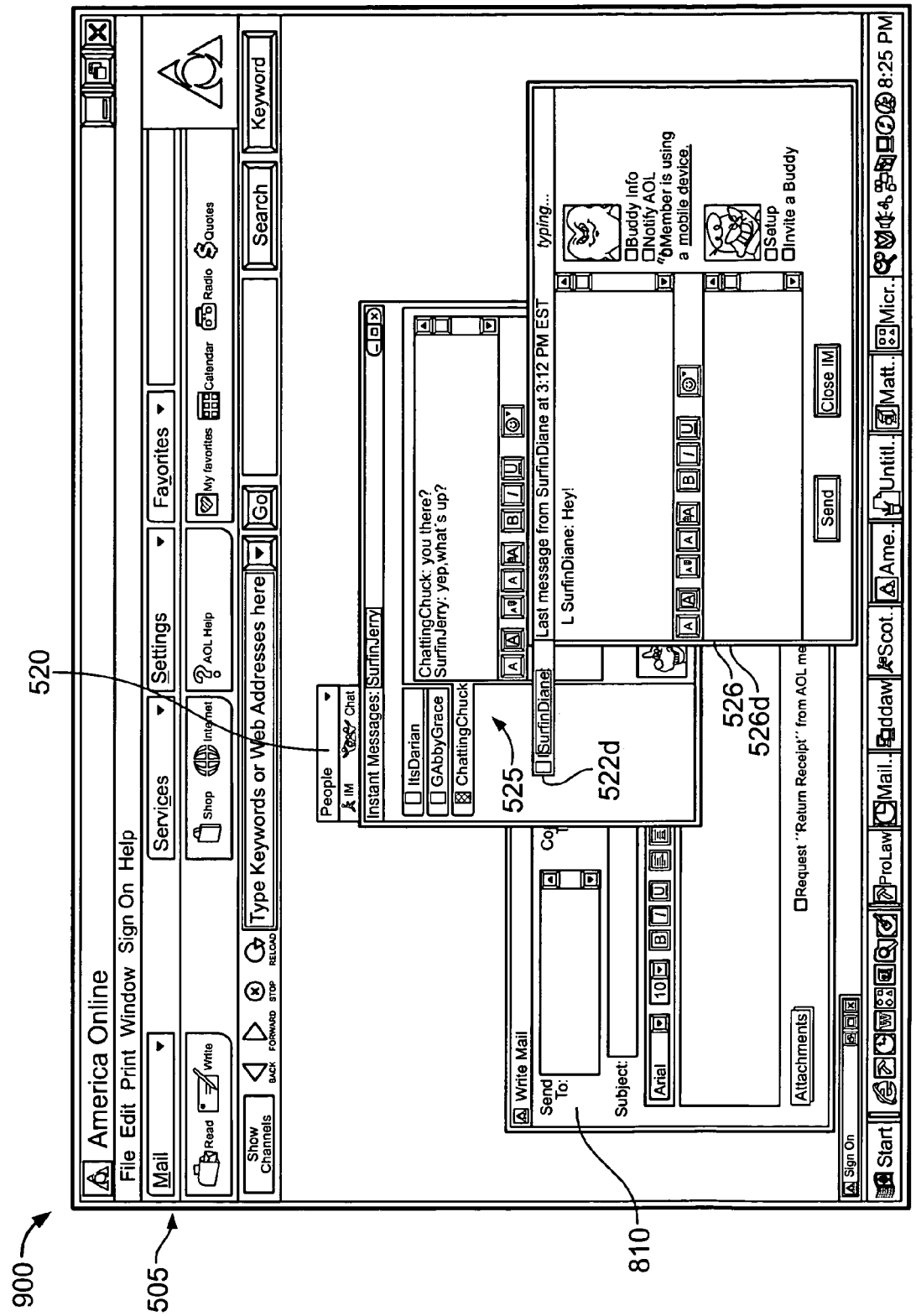

As shown in FIG. 9, an updated UI 900 is rendered in response. In particular, FIG. 9 illustrates yet another example of a general client UI 900 and further illustrates the UI that was discussed above with respect to FIG. 8. In the example of FIG. 9, the user has performed a "tear off" of a tear-off element 522d and sub-interface 526d from the general interface tear-off element 520 and IM interface 525. In one implementation, the user performs the tear off by placing a mouse pointer over the tear-off element 522d and dragging it away from the general interface tear-off element 520 and associated IM interface 525. The torn off tear-off element 522d and sub-interface 526d typically will remain displayed as the user navigates to different content areas, such as the interface for writing e-mail 810. The torn off tear-off element 522d and sub-interface 526d also typically will remain displayed if the general interface tear-off element 520 and associated IM interface 525 are closed, minimized, or otherwise removed from active display. In another implementation, only the tear-off element 522d remains displayed as the user navigates to different content areas.

Figure 12A:
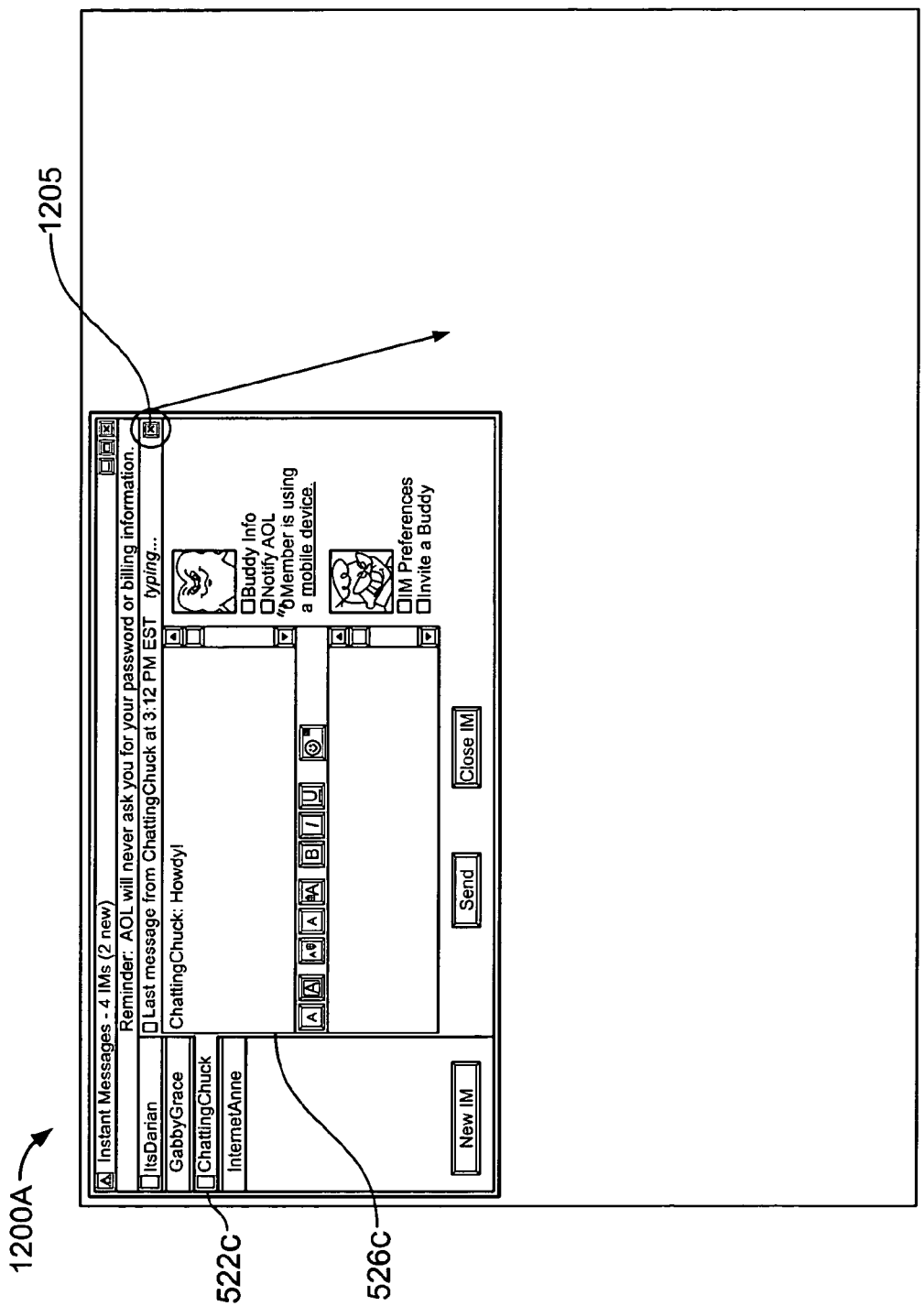
Figure 12B:
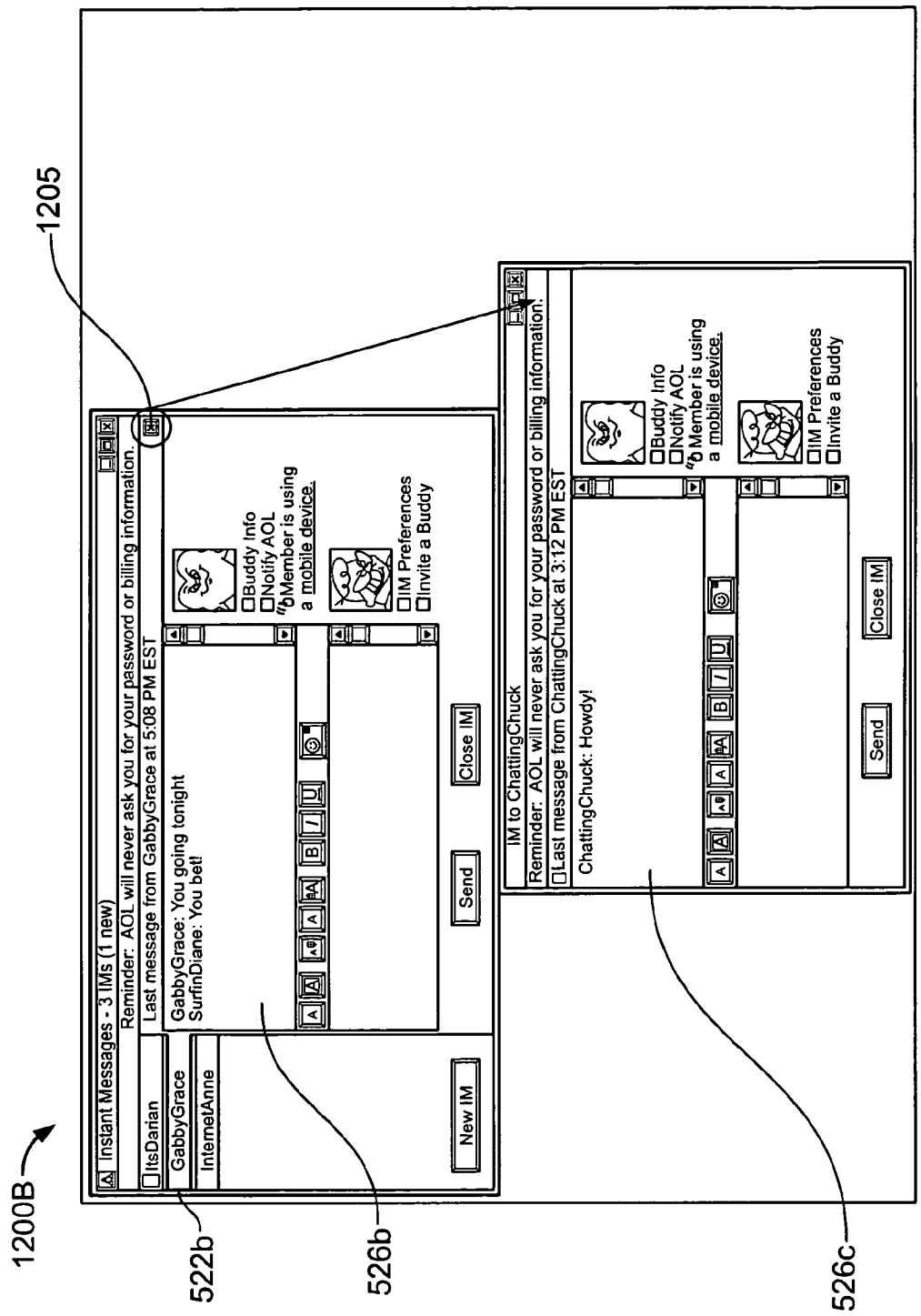

Other implementations are possible for performing the tear off of step 445. For example, as shown in FIGS. 12A and 12B, a user may act on a windowing item 1205 to perform the tear off. In particular, a user may act on the windowing item 1205 in UI 1200A to tear off sub-interface 526c associated with tear-off element 522c. As shown in FIG. 12B, an updated UI 1200B is rendered after the tear off, which may include a display of torn off sub-interface 526c. As discussed above with respect to FIG. 9, after the tear off process, tear-off element 522c and sub-interface 526c typically will remain displayed as the user navigates to different content areas. In one implementation, the tear-off element 522c is not displayed after the sub-interface 526c is torn off. In another implementation, both the tear-off element 522c and sub-interface 526c are displayed after the tear off is performed. In yet another implementation, only the tear-off element 522*c* remains displayed after the tear off is performed.

Figure 12C:
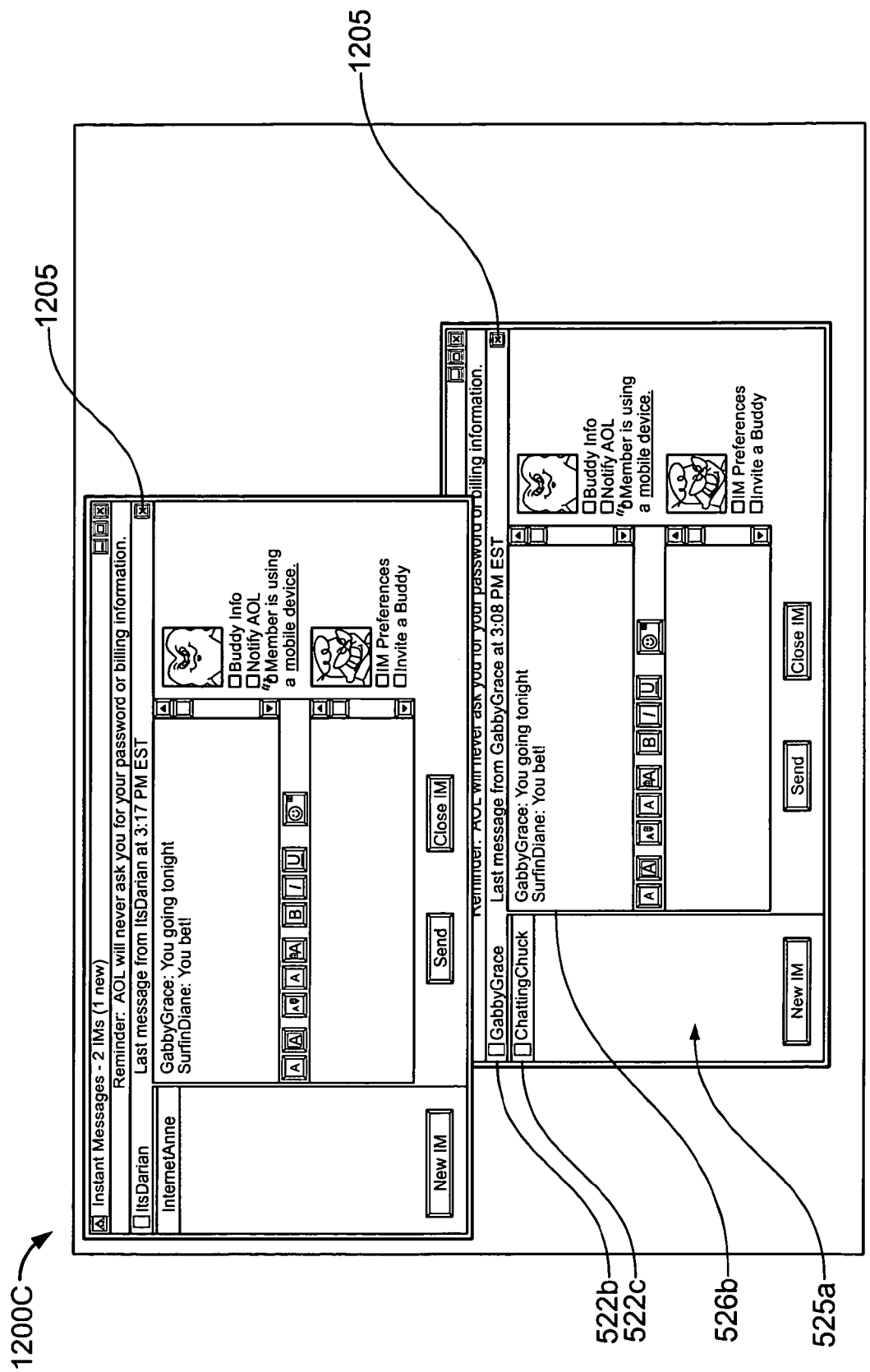

FIGS. 12B and 12C show an implementation of a user performing an additional tear off by acting on the windowing item 1205. In particular, as shown in FIG. 12B, a user may act on the windowing item 1205 in UI 1200B to tear off element 522*b* and sub-interface 526*b* associated with tear off element 522*b*. As shown in FIG. 12C, an updated UI 1200C is rendered after the additional tear off, which may include a display of torn off sub-interface 526*b*. In the example of FIG. 12C, after the tear off process, tear-off element 522*c* and sub-interface 526*c* are grouped together with tear-off element 522*b* and sub-interface 526*b* to form a second IM UI 525*a*. In another implementation, tear-off element 522*c* and sub-interface 526*c* remain separate from tear-off element 522*b* and sub-interface 526*b*.

In one implementation, the windowing item 1205 may be configured to allow the user to select between performing successive tear-offs or successive reattachments. In other implementations, the windowing item 1205 may be configured such that successive actuations of the windowing item 1205 toggle between performing a tear off and performing a reattachment.

Figure 12D:
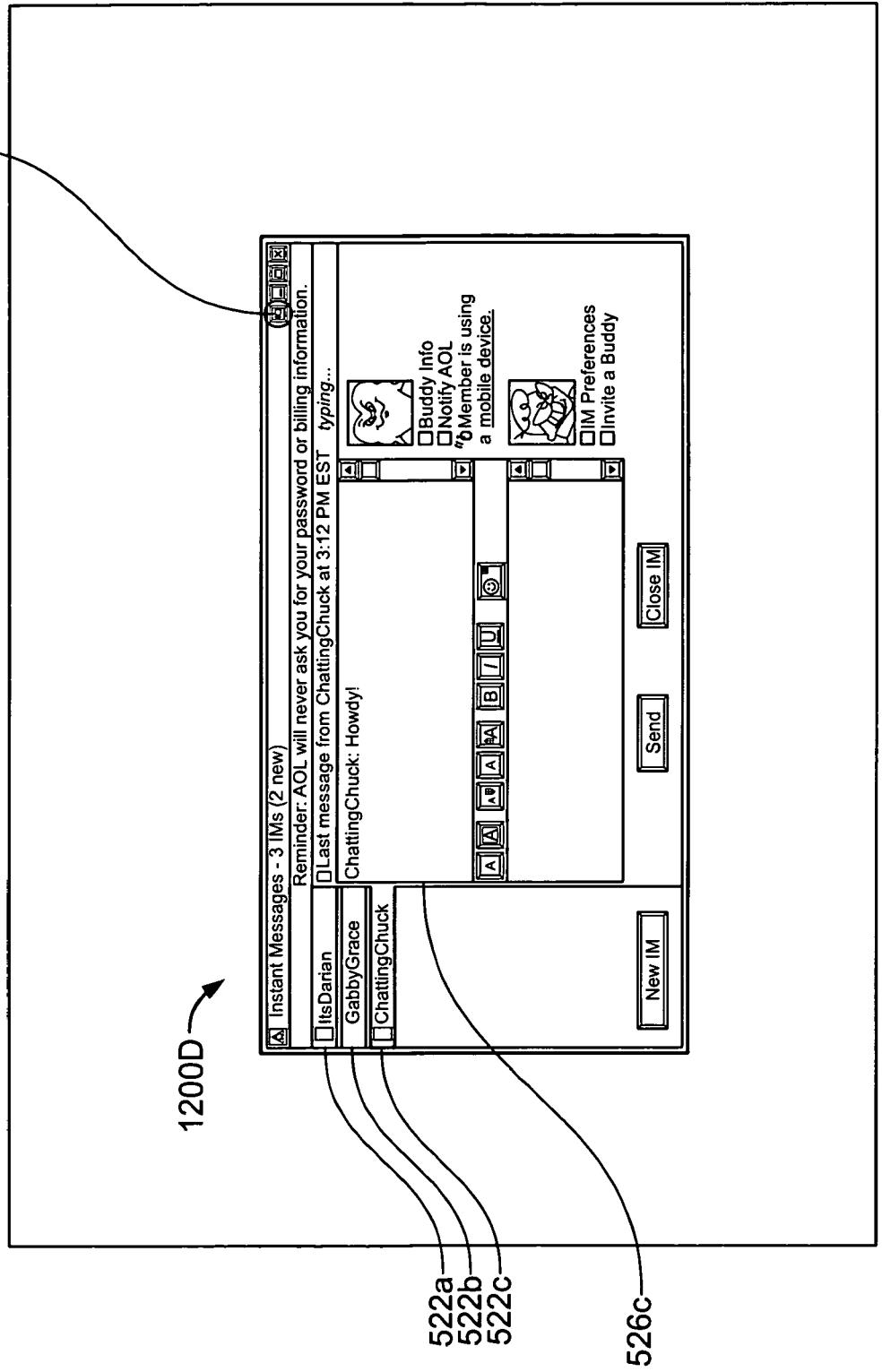
Figure 12E:
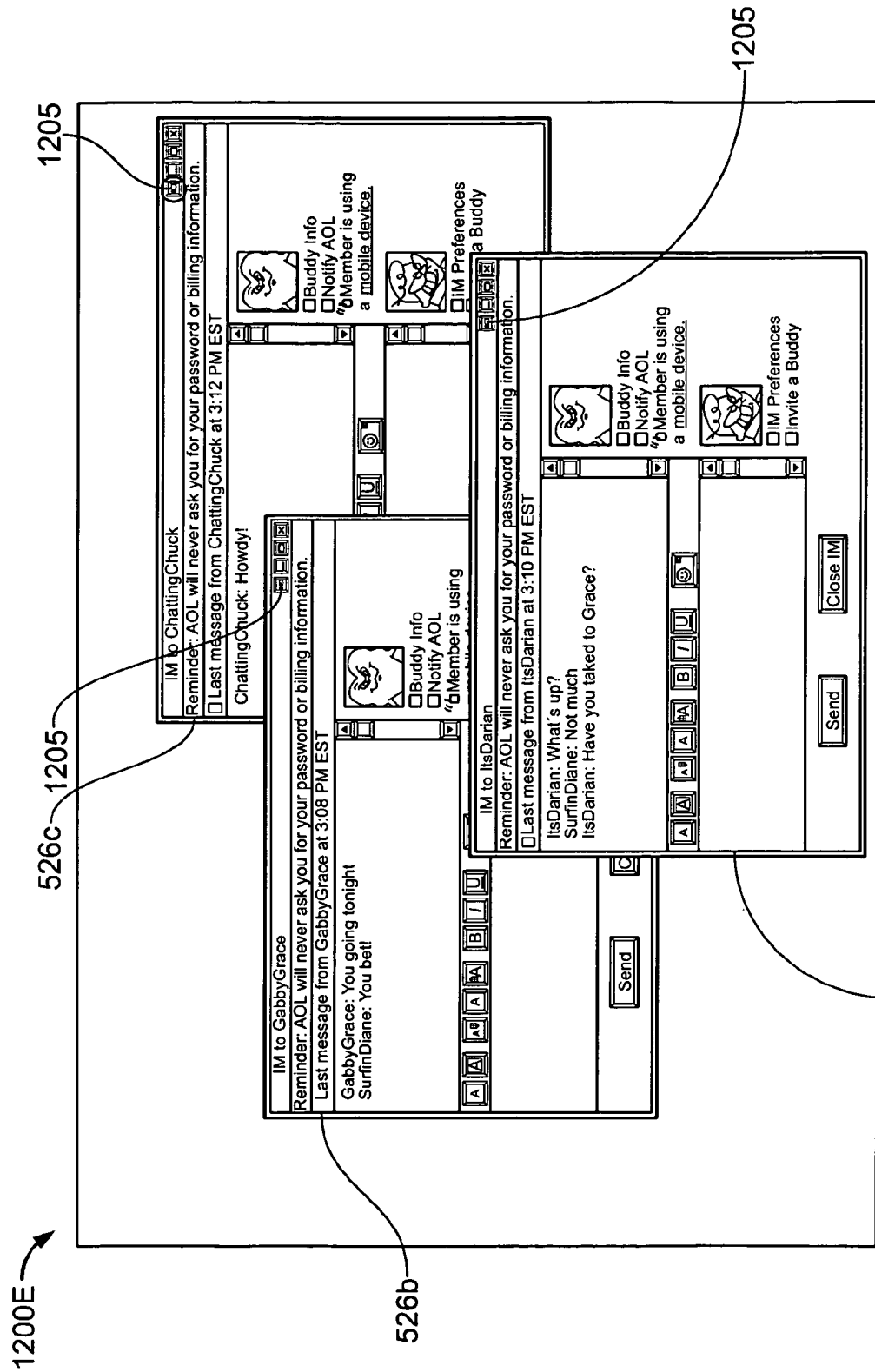

FIGS. 12D and 12E show another exemplary implementation of a user acting on a windowing item 1205 to perform a collective tear off of each of the sub-interfaces 526*a*, 526*b*, and 526*c*. As shown in FIG. 12D, the user may act on a windowing item 1205 to perform the tear off. In particular, a user may act on the windowing item 1205 in UI 1200D to tear off each element 522*a*, 522*b*, 522*c*, and each sub-interface 526*a*, 526*b*, and 526*c*. As shown in FIG. 12E, an updated UI 1200E is rendered after the tear off, which may include a display of torn off sub-interfaces 526*a*, 526*b*, and 526*c*. As discussed above with respect to FIG. 9, after the tear off process the tear-off elements 522*a*, 522*b*, and 522*c* and sub-interfaces 526*a*, 526*b*, and 526*c* typically will remain displayed as the user navigates to different content areas. In one implementation, the tear-off elements 522*a*, 522*b*, and 522*c* are not displayed after tear off of the sub-interface 526*c*. In another implementation, both the tear-off elements 522*a*, 522*b*, 522*c* and sub-interfaces 526*a*, 526*b*, 526*c* are displayed after the tear off is performed. In yet another implementation, only the tear-off elements 522*a*, 522*b*, 522*c* remains displayed after the tear off is performed.

Next, the user reattaches the IM general interface tear-off element (step 450). As discussed below with respect to FIG. 10, the user may reattach the general interface tear-off element 520 and the IM interface 525 to the toolbar 505 by placing a mouse pointer over the general interface tear-off element 520 and dragging the tear-off element toward the toolbar 505.

Figure 10:
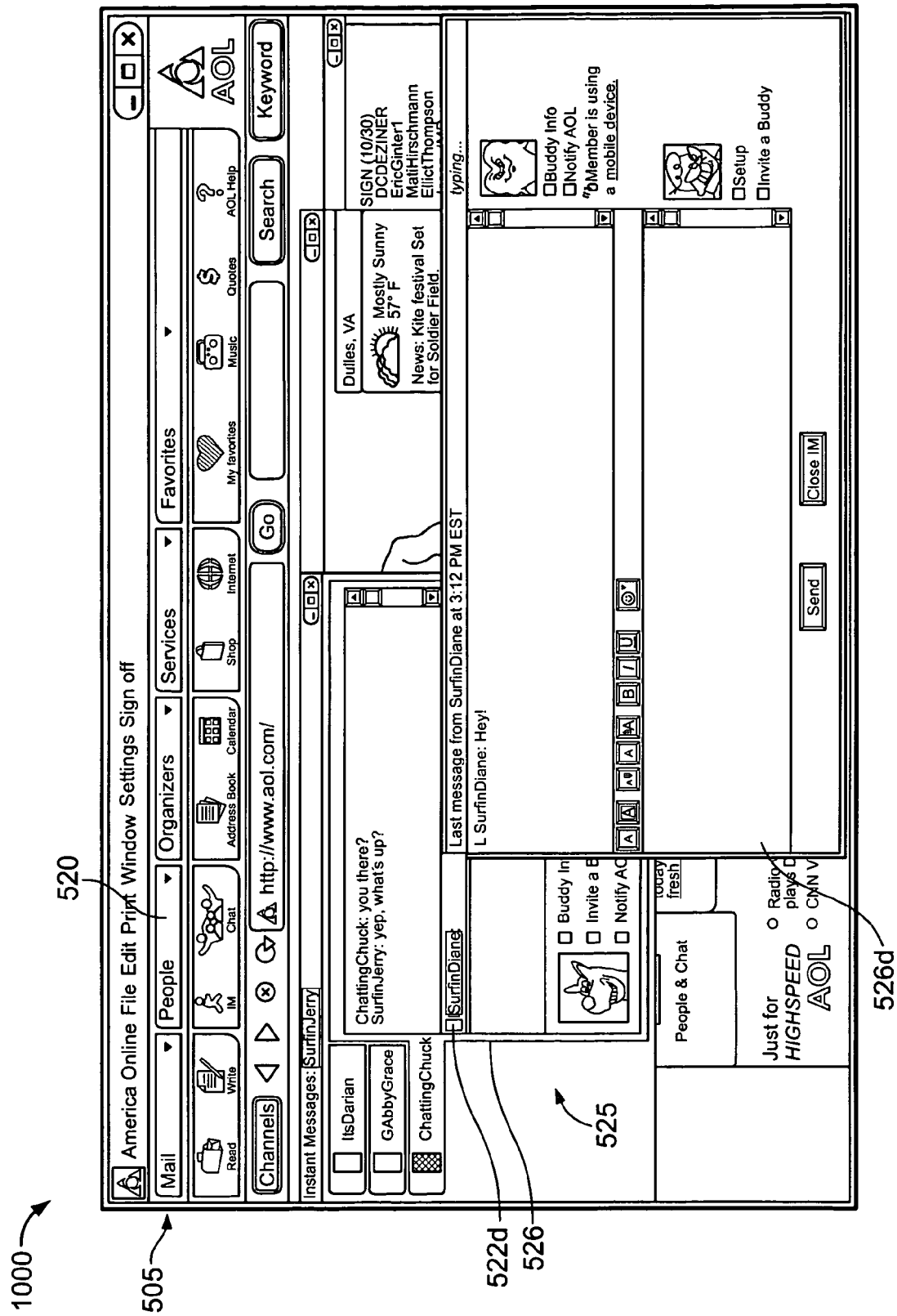

FIG. 10 is an example of a general client UI 1000 and further illustrates the UI that was discussed above with respect to FIG. 9. In the example of FIG. 10, the user has navigated back to the content area shown in FIG. 5. The user has also performed a reattachment of general interface tear-off element 520 and IM interface 525 to the toolbar 505. The tear-off element 522*d* and sub-interface 526*d* remain torn off. When a sub-interface 526 is torn off, then the display of that sub-interface persists beyond the active display of the IM interface 525. In one implementation, the user performs the reattachment by placing a mouse pointer over the general interface tear-off element 520 and dragging the element 520 toward the toolbar 505. The general interface tear-off element 520 and the associated IM interface 525 no longer remain displayed as the user navigates to different content areas, such as the interface for writing e-mail 810 (shown in FIG. 8).

The user then navigates to different functionality, and an updated UI is rendered (step 455). For example, as shown below with respect to FIG. 11, a user may navigate to an interface for writing e-mail 810, which is activated by user manipulation of general interface tear-off element 510 or 510*a*. The tear-off element 522*d* and sub-interface 526*d* are persistent in the UI 800.

Figure 11:
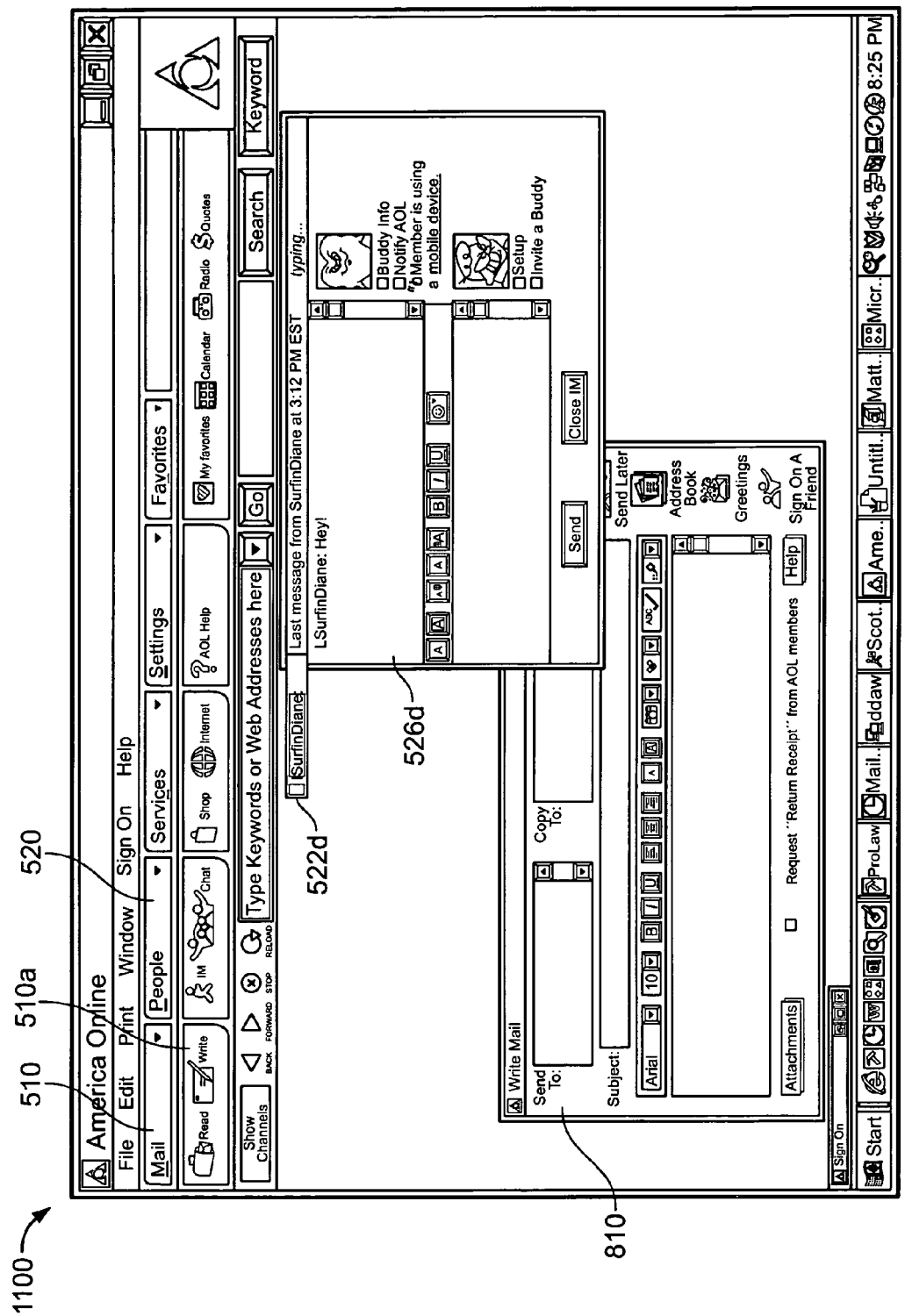

Referring to FIG. 11, an updated UI 1100 is rendered in response to this user navigation. In particular, FIG. 11 is an illustration of a general client UI 1000 and further illustrates the UI discussed above with respect to FIG. 10. In the example of FIG. 11, the user has navigated to an interface for writing e-mail 810, which may be activated by user manipulation of general interface tear-off element 510 or 510*a*. The user has also performed a "tear off" of tear-off element 522*d* and sub-interface 526*d* from the general interface tear-off element 520 and IM interface 525 (shown in FIG. 5). In one implementation, as shown above with respect to FIG. 10, the performs the tear off by placing a mouse pointer over the tear-off element 522*d* and dragging it away from the general interface tear-off element 520 and associated IM interface 525. As shown in FIG. 11, the torn off tear-off element 522*d* and sub-interface 526*d* will remain displayed as the user navigates to different content areas, such as the interface for writing e-mail 810. The torn off tear-off element 522*d* and sub-interface 526*d* also will remain displayed if the general interface tear-off element 520 and associated IM interface 525 are closed, minimized, or otherwise removed from active display. In another implementation, only the tear-off element 522*d* remains displayed as the user navigates to different content areas.

Next, the user navigates to the IM interface and reattaches the second tear-off element (step 460). For example, as shown in FIG. 5, the user may reattach the second tear-off element 522*d* to the IM interface 525. In one implementation, the user reattaches the tear-off element 522*d* by placing a mouse pointer over the tear-off element 522*d* and dragging it over the general interface tear-off element 520 and associated IM interface 525.

Other implementations are possible for performing the reattachment of step 460. For example, as shown in FIGS. 12B and 12A, a user may act on a windowing item 1205 to perform the reattachment. In particular, a user may act on the windowing item 1205 in UI 1200B to perform a reattachment of tear-off element 522*c* and sub-interface 526*c*. As shown in FIG. 12A, an updated UI 1200A is rendered after the reattachment and may include a display of reattached sub-interface 526*c*.

Figure 12F:
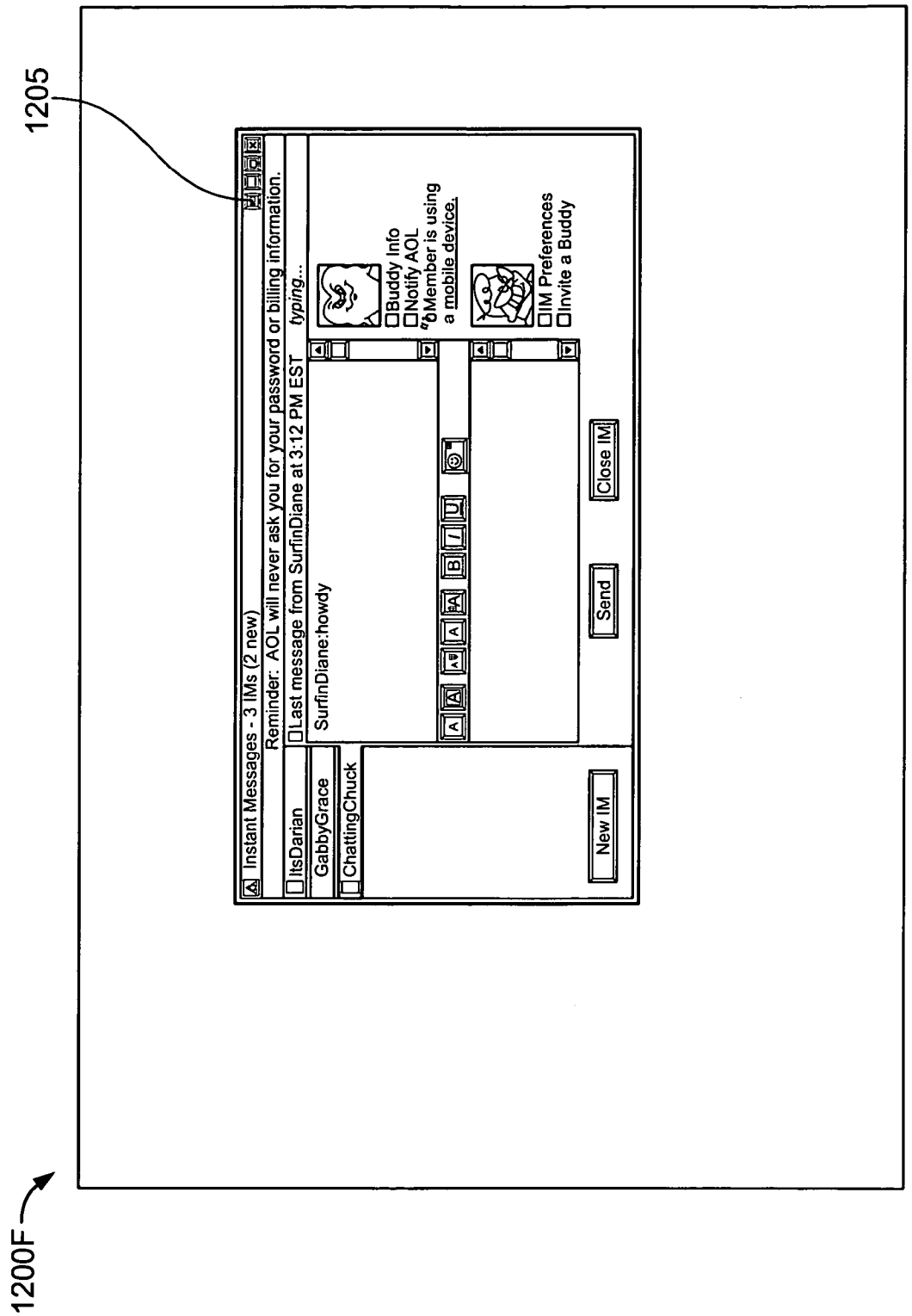

FIGS. 12E and 12F show another exemplary implementation of a user acting on a windowing item 1205 to perform a collective reattachment of each of the sub-interfaces 526*a*, 526*b*, 526*c*. As shown in FIG. 12E, the user may act on a windowing item 1205 to perform the reattachment. In particular, a user may act on the windowing item 1205 in UI 1200E to perform a reattachment of each tear-off element 522*a*, 522*b*, 522*c* and each sub-interface 526*a*, 526*b*, 526*c*. As shown in FIG. 12F, an updated UI 1200F is rendered after the reattachment.

The relative placement of steps 405–460 with respect to other steps in FIG. 4, and with respect to each other, may vary.

Other implementations are within the scope of the following claims. For example, although the examples above are given in an instant message context, other online applications or communications systems with similar attributes may be used.

What is claimed is:

1. A graphical user interface comprising:
   a first element selectable to invoke a first sub-interface that displays first content corresponding to an existing first instant messaging communications session;
   a second element selectable to invoke a second sub-interface that displays second content corresponding to an existing second instant messaging communications session;
   a general instant messaging user interface within which the first element and the second element are initially presented;
   a first selectable component of the first element that is selectable to change a position of the first content relative to a position of the general instant messaging user interface and relative to a position of the second element; and
   a second selectable component of the second element that is selectable to change a position of the second content relative to the position of the general instant messaging user interface and relative to a position of the first element.

2. The user interface of claim 1 in which the first and second elements comprise tabs.

3. The user interface of claim 1 in which the first and second elements comprise buttons.

4. The user interface of claim 1 further comprising a status control associated with one or both of the first and second elements, the status control enabling an indication of whether a message in the corresponding instant messaging communications session has been perceived by a user.

5. The user interface of claim 1 further comprising a general interface element configured to enable collective selection of the first and second elements and collective visual separation of the first and second sub-interfaces from other sub-interfaces of the general interface.

6. The user interface of claim 5 in which the general interface element comprises a tab.

7. The user interface of claim 5 in which the general interface element comprises a button.

8. The user interface of claim 5 in which the general interface is configured to enable reattachment of the first and second sub-interfaces to the other sub-interfaces of the general interface.

9. The user interface of claim 1 in which one or both of first and second elements are rendered visually as an integral part of the general instant messaging user interface.

10. The user interface of claim 1 in which one or both of the first and second elements are configured to be separately manipulable.

11. The user interface of claim 1 in which one or both of the first and second elements are configured to be separately removable from the general instant messaging user interface.

12. The user interface of claim 1 in which one or both of the first and second elements are configured to be separately invokable.

13. The user interface of claim 1 in which one or both of the first and second elements are configured to be separately minimizable.

14. The user interface of claim 1 wherein the first and second elements are configured to display information about the corresponding first and second instant messaging sessions.

15. The user interface of claim 1 in which the first sub-interface is movable, by a user, to visually separate the first sub-interface from the general interface and the second sub-interface, and to maintain the first and second sub-interfaces as independent entities.

16. The user interface of claim 15 in which the first sub-interface is moveable, by the user, to reattach the first sub-interface to the general interface.

17. The user interface of claim 1 wherein the existing first instant messaging communications session comprises an instant messaging communications session previously established between a user and a first party.

18. The user interface of claim 17 wherein the existing second instant messaging communications session comprises an instant messaging communications session previously established between a user and a second party.

19. The user interface of claim 1 wherein, prior to changing the position of the first content and the position of the second content, the first and second elements are alternately selectable by a user to enable display of the corresponding first or second sub-interface.

20. The user interface of claim 1 wherein, after changing the position of the first content and the position of the second content, at least a portion of the first sub-interface and at least a portion of the second sub-interface are concurrently perceivable on the graphical user interface.

21. The user interface of claim 1 wherein the general user interface shows a subset of identifiers within a user's buddy list, the subset being defined to include buddies with whom conversations are presently open.

22. The user interface of claim 1 wherein the first and second sub-interfaces are, by a default, integrated into the general instant messaging user interface, and are separable from the general instant messaging user interface upon user manipulation of the first and second selectable components.

23. A computer program, stored on a computer readable medium, comprising instructions for:
   rendering a first element selectable to invoke a first sub-interface that displays first content corresponding to an existing first instant messaging communications session;
   rendering a second element selectable to invoke a second sub-interface that displays second content corresponding to an existing second instant messaging communications session;
   rendering a general instant messaging user interface within which the first element and the second element are initially rendered;
   receiving a user selection of a first selectable component of the first element to change a position of the first content relative to a position of the general instant messaging user interface and relative to a position of the second element; and
   receiving a user selection of a second selectable component of the second element to change a position of the second content relative to the position of the general instant messaging user interface and relative to a position of the first element.

24. The computer program of claim 23 in which the first and second elements comprise tabs.

25. The computer program of claim 23 in which the first and second elements comprise buttons.

26. The computer program of claim 23 further comprising instructions for rendering a status control associated with one or both of the first and second elements, the status control enabling an indication of whether a message in the corresponding instant messaging communications session has been perceived by a user.

27. The computer program of claim 23 further comprising instructions for rendering a general interface element configured to enable collective selection of the first and second elements and collective visual separation of the first and second sub-interfaces from other sub-interfaces of the general interface.

28. The computer program of claim 27 in which the general interface element comprises a tab.

29. The computer program of claim 27 in which the general interface element comprises a button.

30. The computer program of claim 27 in which the general interface is configured to enable reattachment of the first and second sub-interfaces to the other sub-interfaces of the general interface.

31. The computer program of claim 23 in which one or both of first and second elements are rendered visually as an integral part of the general instant messaging user interface.

32. The computer program of claim 23 in which one or both of the first and second elements are configured to be separately manipulable.

33. The computer program of claim 23 in which one or both of the first and second elements are configured to be separately removable from the general instant messaging user interface.

34. The computer program of claim 23 in which one or both of the first and second elements are configured to be separately invokable.

35. The computer program of claim 23 in which one or both of the first and second elements are configured to be separately minimizable.

36. The computer program of claim 23 wherein the first and second elements are configured to display information about the corresponding first and second instant messaging sessions.

37. The computer program of claim 23 in which the first sub-interface is movable, by a user, to visually separate the first sub-interface from the general interface and the second sub-interface, and to maintain the first and second sub-interfaces as independent entities.

38. The computer program of claim 37 in which the first sub-interface is moveable by the user to reattach the first sub-interface to the general interface.

39. The computer program of claim 23 wherein the existing first instant messaging communications session comprises an instant messaging communications session previously established between a user and a first party.

40. The computer program of claim 23 wherein the existing second instant messaging communications session comprises an instant messaging communications session previously established between a user and a second party.

41. The computer program of claim 23 wherein, prior to changing the position of the first content and the position of the second content, the first and second elements are alternately selectable by a user to enable display of the corresponding first or second sub-interface.

42. The computer program of claim 23 wherein, after changing the position of the first content and the position of the second content, at least a portion of the first sub-interface and at least a portion of the second sub-interface are concurrently perceivable on the graphical user interface.

43. The computer program of claim 23 wherein the general user interface shows a subset of identifiers within a user's buddy list, the subset being defined to include buddies with whom conversations are presently open.

44. The computer program of claim 23 wherein the first and second sub-interfaces are, by a default, integrated into the general instant messaging user interface, and are separable from the general instant messaging user interface upon user manipulation of the first and second selectable components.

* * * * *